(12) United States Patent
Iwamoto

(10) Patent No.: US 10,078,202 B2
(45) Date of Patent: Sep. 18, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/468,750

(22) Filed: Mar. 24, 2017

(65) Prior Publication Data
US 2017/0276917 A1   Sep. 28, 2017

(30) Foreign Application Priority Data
Mar. 25, 2016  (JP) ................. 2016-061487

(51) Int. Cl.
| | |
|---|---|
| G02B 15/20 | (2006.01) |
| G03B 5/00 | (2006.01) |
| G02B 15/173 | (2006.01) |
| H04N 5/232 | (2006.01) |

(52) U.S. Cl.
CPC .......... G02B 15/20 (2013.01); G02B 15/173 (2013.01); G03B 5/00 (2013.01); G03B 2205/0046 (2013.01); H04N 5/23296 (2013.01)

(58) Field of Classification Search
CPC ........ G02B 15/15; G02B 15/16; G02B 15/20; G02B 15/22; G02B 15/163; G02B 13/009
USPC ................. 359/676–679, 686, 687, 689, 690
See application file for complete search history.

(56) References Cited

U.S. PATENT DOCUMENTS

| | | | |
|---|---|---|---|
| 9,217,851 B2 | 12/2015 | Iwamoto | |
| 2014/0055659 A1 | 2/2014 | Iwamoto | |
| 2015/0160444 A1* | 6/2015 | Koizumi | G02B 13/18 359/684 |
| 2015/0323764 A1* | 11/2015 | Mori | G02B 15/173 348/360 |

FOREIGN PATENT DOCUMENTS

| | | |
|---|---|---|
| JP | 2011-180218 A | 9/2011 |
| JP | 2013-109013 A | 6/2013 |
| JP | 2014-235177 A | 12/2014 |

* cited by examiner

*Primary Examiner* — Darryl J Collins
(74) *Attorney, Agent, or Firm* — Carter, DeLuca, Farrell & Schmidt, LLP

(57) ABSTRACT

Provided is a zoom lens, including: a front lens group only including one or more positive lens unit; a magnification-varying lens unit consisting of a negative lens unit which moves during zooming; and a positive rear lens group including a plurality of lens units, in which an interval between adjacent lens units is changed during zooming, in which front lens group includes a positive focusing unit La, in which rear lens group includes a focusing unit Lb, in which focusing unit La moves toward object side and focusing unit Lb moves toward one of object side and image side, during focusing from infinity to close distance, and a movement amount of focusing unit La at a wide angle end during focusing from infinity to closest distance, and a movement amount of focusing unit La at a telephoto end during focusing from infinity to closest distance are each appropriately set.

19 Claims, 19 Drawing Sheets

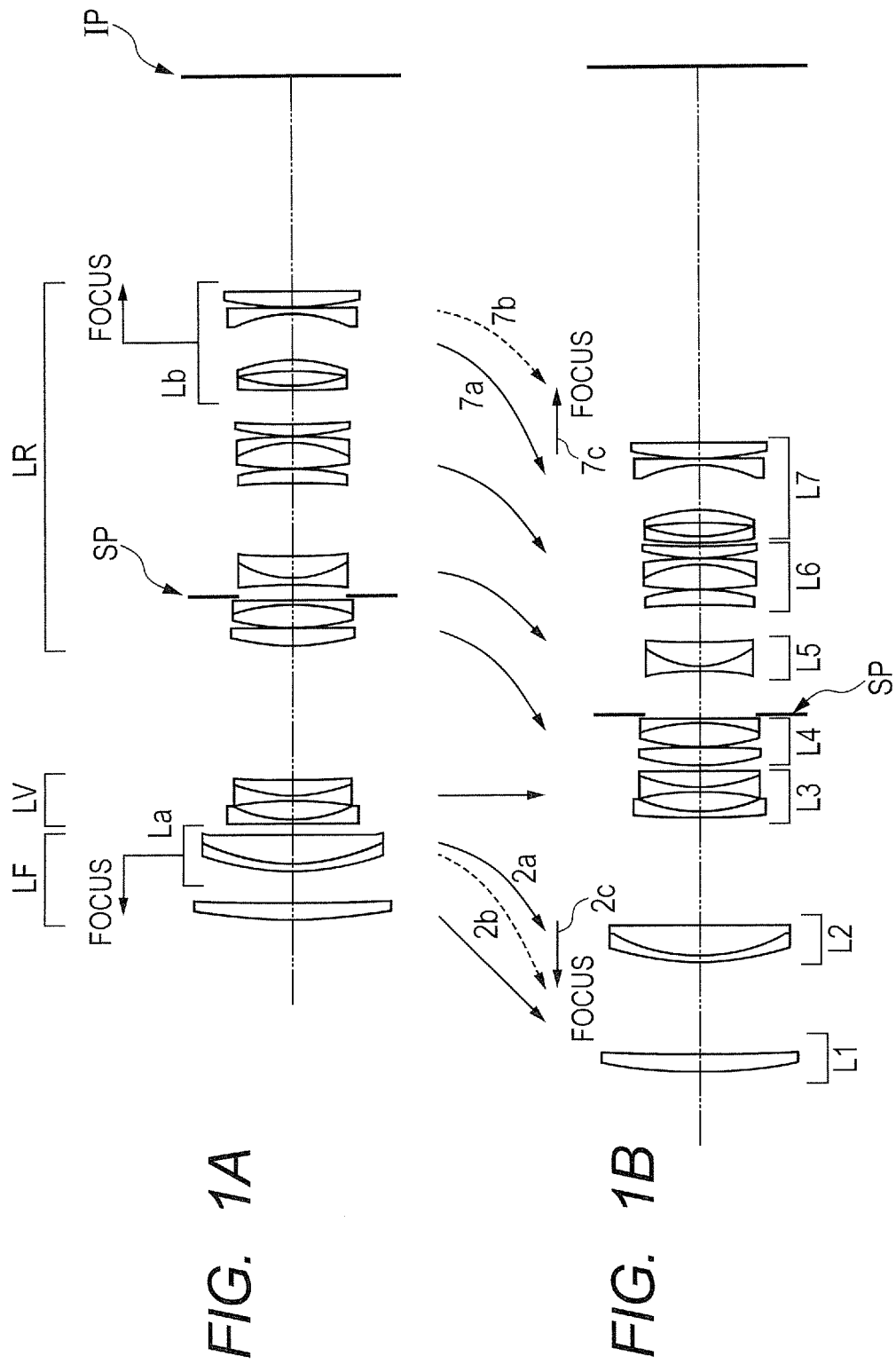

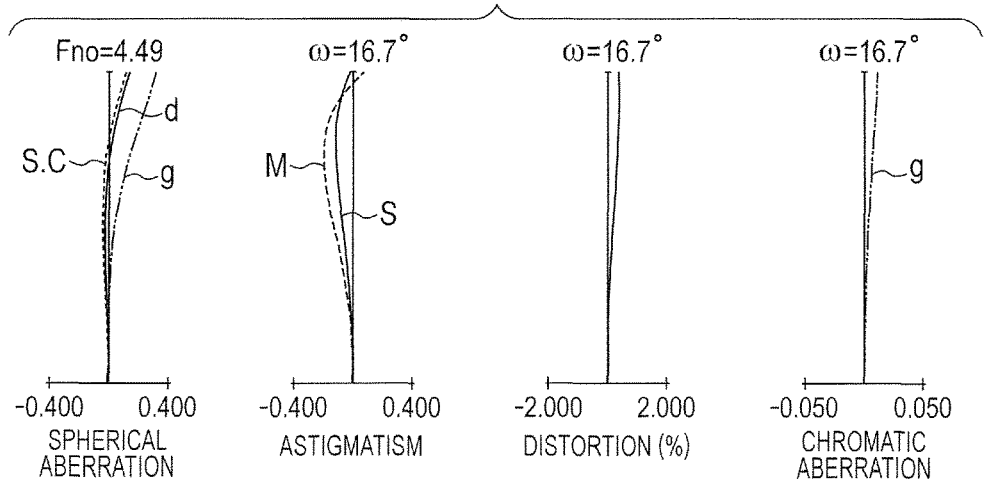
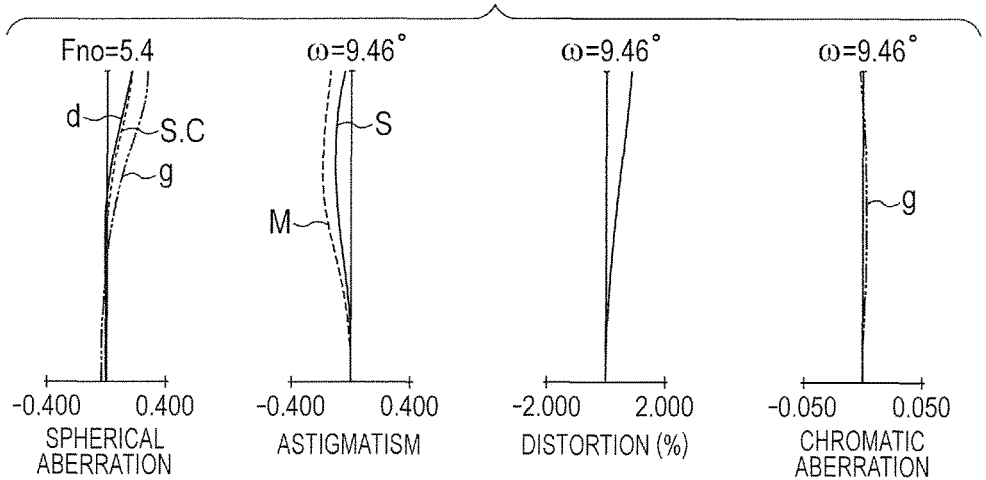
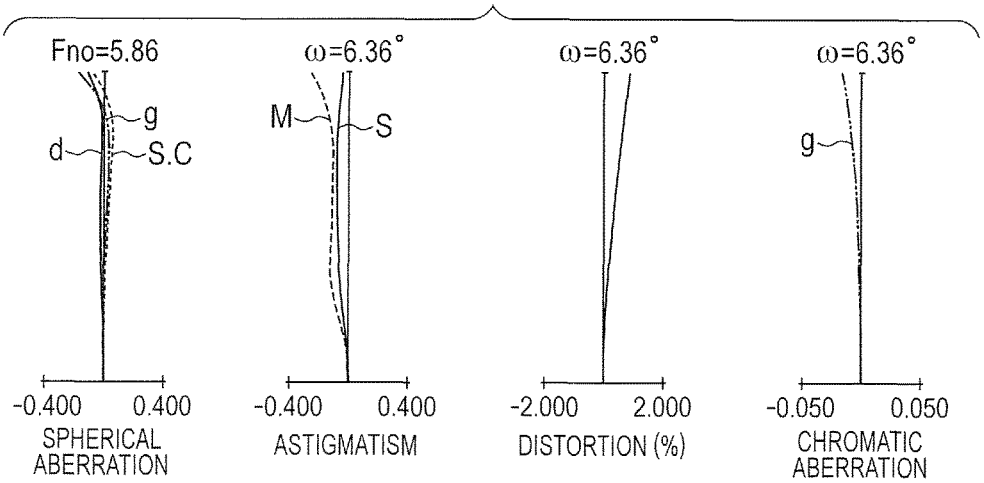

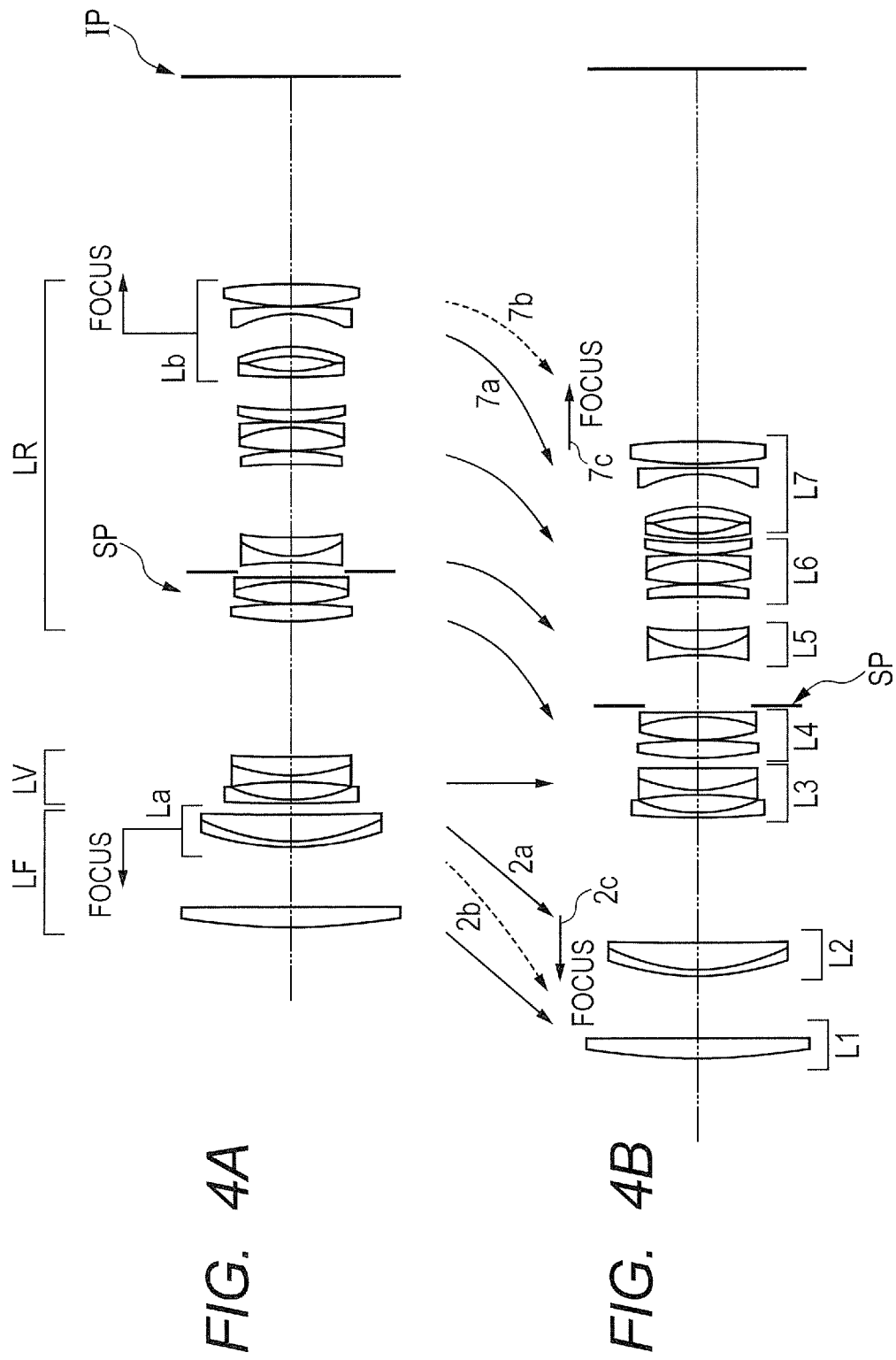

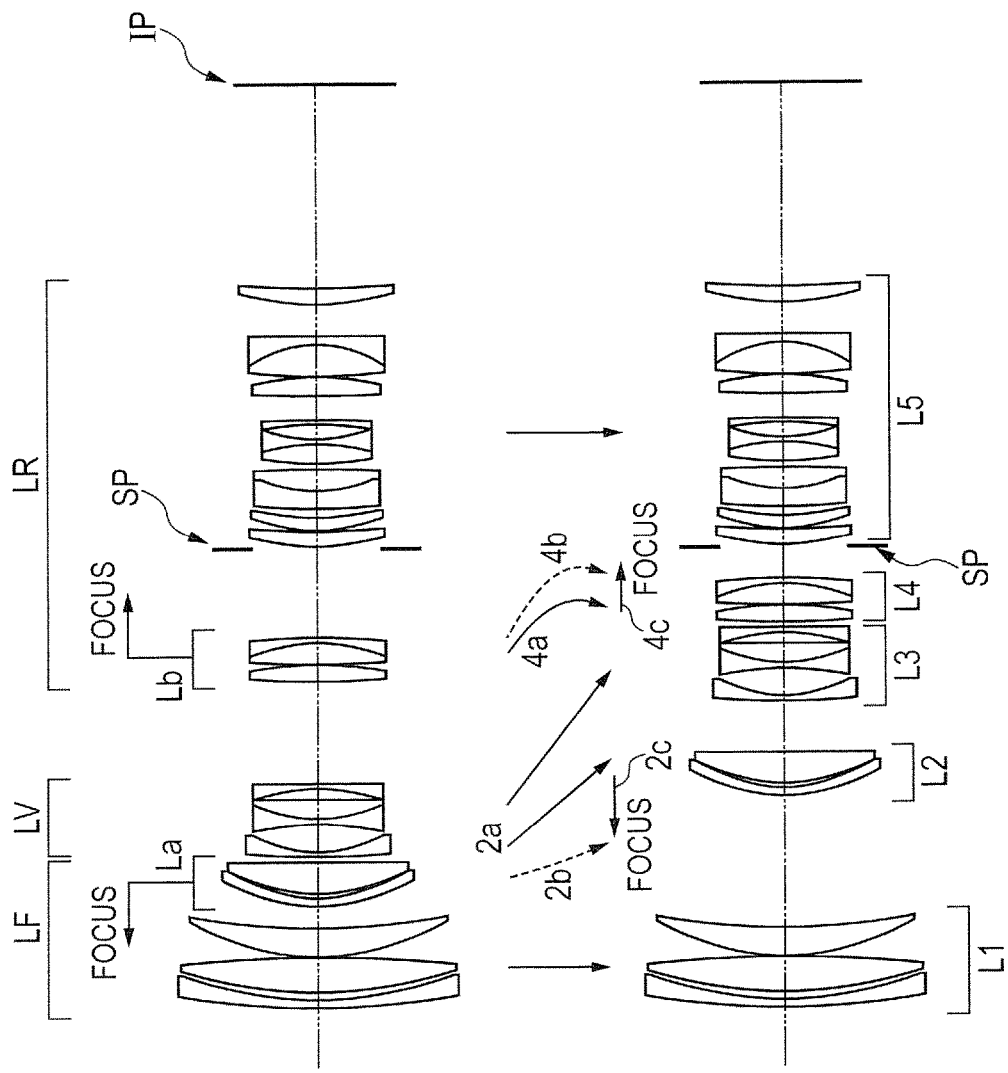

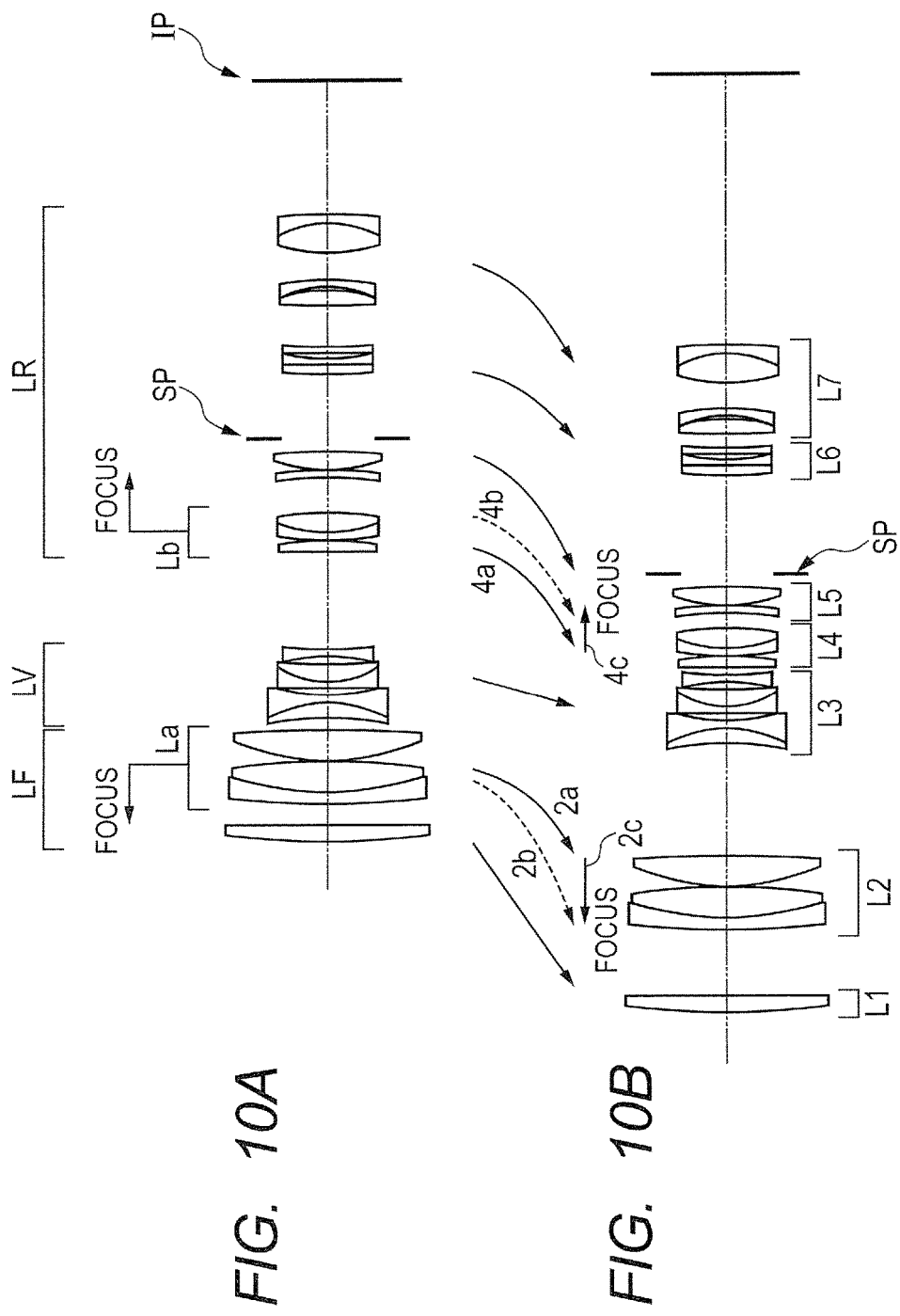

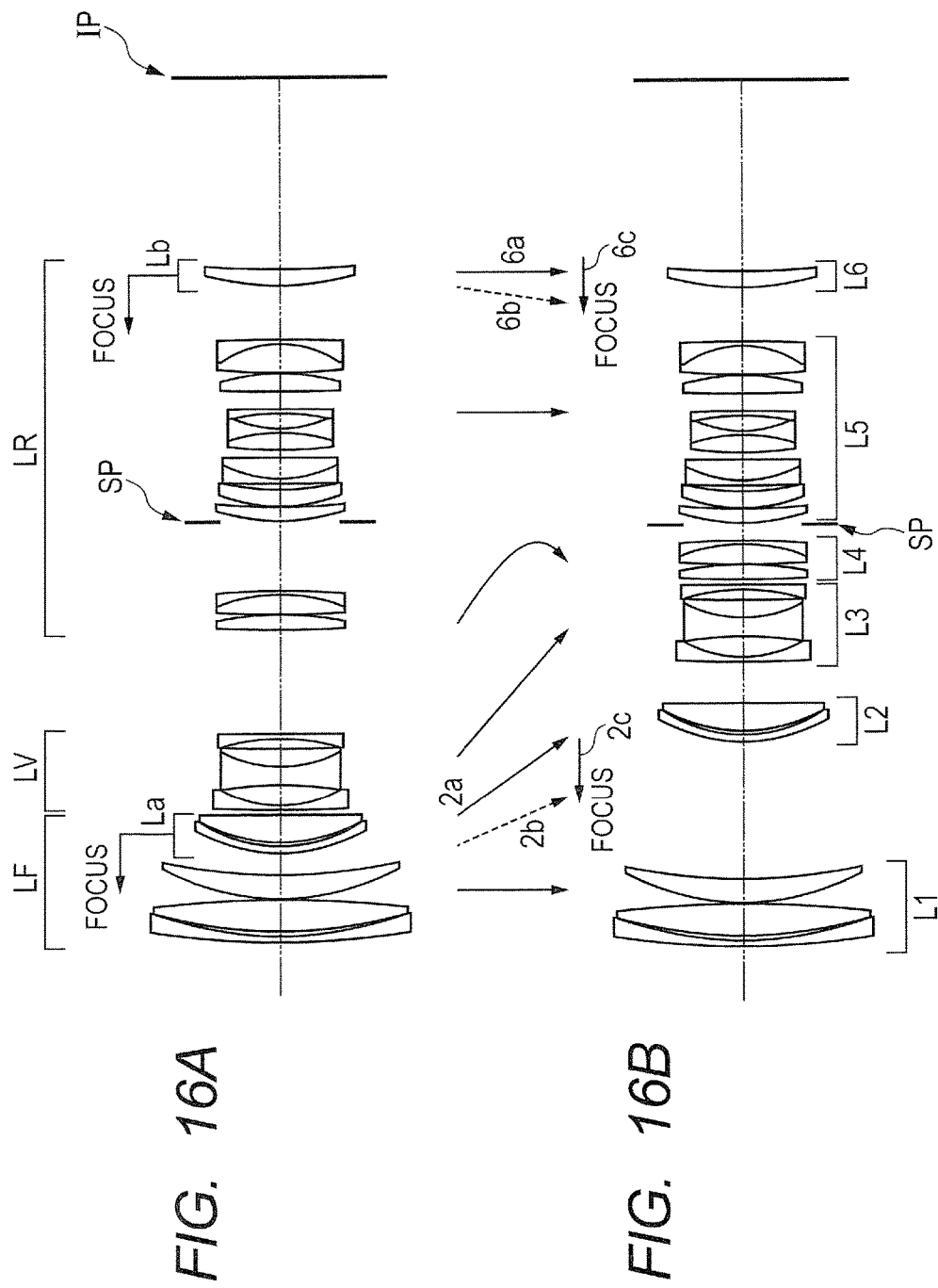

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system used in an image pickup apparatus using an image pickup element, for example, a video camera, an electronic still camera, a broadcasting camera, or a monitoring camera, or an image pickup apparatus, for example, a silver halide film camera.

Description of the Related Art

In recent years, it is demanded for image pickup optical systems that are used in image pickup apparatus to be zoom lenses having a high zoom ratio and high optical characteristics over an entire zoom range thereof while being small as a whole. Further, it is also demanded for such image pickup optical systems to have small aberration variation during focusing, and high optical characteristics over an entire object distance thereof.

As a zoom lens capable of easily achieving a high zoom ratio, there has been known a positive lead type zoom lens in which a lens unit having a positive refractive power is arranged closest to an object side. In order to provide a positive lead type zoom lens having small aberration variation during focusing, and high optical characteristics over an entire object distance thereof, there has been known a zoom lens employing a floating system in which two lens units are configured to move during focusing.

In Japanese Patent Application Laid-Open No. 2011-180218, there is disclosed a zoom lens including, in order from an object side to an image side, a first lens unit to a fifth lens unit having positive, negative, negative, positive, and negative refractive powers, in which the third lens unit and the fifth lens unit are configured to move in opposite directions, to thereby perform focusing.

In Japanese Patent Application Laid-Open No. 2013-109013, there is disclosed a zoom lens including, in order from an object side to an image side, a first lens unit to a seventh lens unit having positive, negative, positive, positive, negative, positive, and negative refractive powers, in which the fifth lens unit and the sixth lens unit are configured to move in opposite directions, to thereby perform focusing.

In order to reduce aberration variation due to focusing, it is effective to employ a floating system in which a plurality of lens units are configured to move in an optical axis direction during focusing. With the use of the floating system, the movement amount of a focusing unit for focusing at close distance can be reduced, and hence aberration variation is easily reduced while an entire lens system is downsized. In particular, it is easy to perform focusing at close distance, which can be regarded as macro photography, while reducing aberration variation.

In order to provide a positive lead type zoom lens having a high zoom ratio and high optical characteristics over an entire zoom range and an entire object distance thereof while downsizing the entire system, it is important to appropriately set elements that form the zoom lens. It is important to appropriately set, for example, a zoom type (the number of lens units, the refractive power of each lens unit, movement conditions during zooming, or the like), selection of a lens unit configured to move during focusing, and the lens configuration of the lens unit configured to move during focusing.

SUMMARY OF THE INVENTION

The present invention has an object to provide a zoom lens capable of easily achieving a high zoom ratio and high optical characteristics over an entire zoom range and an entire object distance thereof, and an image pickup apparatus including the zoom lens.

According to one embodiment of the present invention, there is provided a zoom lens, including, in order from an object side to an image side:

a front lens group LF only including one or more lens unit having a positive refractive power;

a magnification-varying lens unit LV consisting of a lens unit having a negative refractive power and being configured to move during zooming; and a rear lens group LR having a positive refractive power, which includes a plurality of lens units, in which an interval between each pair of adjacent lens units is changed during zooming, in which the front lens group LF includes a focusing unit La having a positive refractive power, in which the rear lens group LR includes a focusing unit Lb, in which the focusing unit La is configured to move toward the object side and the focusing unit Lb is configured to move toward one of the object side and the image side, during focusing from infinity to close distance, and in which the following conditional expression is satisfied:

$$0.1 < Maw/Mat < 0.6,$$

where Maw represents a movement amount of the focusing unit La at a wide angle end during focusing from infinity to closest distance, and Mat represents a movement amount of the focusing unit La at a telephoto end during focusing from infinity to closest distance.

Further features of the present invention will become apparent from the following description of exemplary embodiments with reference to the attached drawings.

BRIEF DESCRIPTION OF THE DRAWINGS

FIG. 1A is a lens cross-sectional view of a zoom lens according to Example 1 of the present invention at a wide angle end.

FIG. 1B is a lens cross-sectional view of the zoom lens of Example 1 at a telephoto end.

FIG. 3A is aberration diagrams of the zoom lens of Example 1 at the wide angle end when focused at close distance.

FIG. 3B is aberration diagrams of the zoom lens of Example 1 at the intermediate zoom position when focused at close distance.

FIG. 3C is aberration diagrams of the zoom lens of Example 1 at the telephoto end when focused at close distance.

FIG. 4A is a lens cross-sectional view of a zoom lens according to Example 2 of the present invention at the wide angle end.

FIG. 4B is a lens cross-sectional view of the zoom lens of Example 2 at the telephoto end.

FIG. 7A is a lens cross-sectional view of a zoom lens according to Example 3 of the present invention at the wide angle end.

FIG. 7B is a lens cross-sectional view of the zoom lens of Example 3 at the telephoto end.

FIG. 10A is a lens cross-sectional view of a zoom lens according to Example 4 of the present invention at the wide angle end.

FIG. 10B is a lens cross-sectional view of the zoom lens of Example 4 at the telephoto end.

FIG. 16A is a lens cross-sectional view of a zoom lens according to Example 6 of the present invention at the wide angle end.

FIG. 16B is a lens cross-sectional view of the zoom lens of Example 6 at the telephoto end.

DESCRIPTION OF THE EMBODIMENTS

Now, exemplary embodiments of the present invention are described with reference to the attached drawings. A zoom lens of the present invention includes, in order from an object side to an image side: a front lens group LF only including one or more lens unit having a positive refractive power; a magnification-varying lens unit LV including a lens unit having a negative refractive power and being configured to move during zooming; and a rear lens group LR having a positive refractive power, which includes a plurality of lens units. Further, an interval between each pair of adjacent lens units is changed during zooming.

Figure 2A:
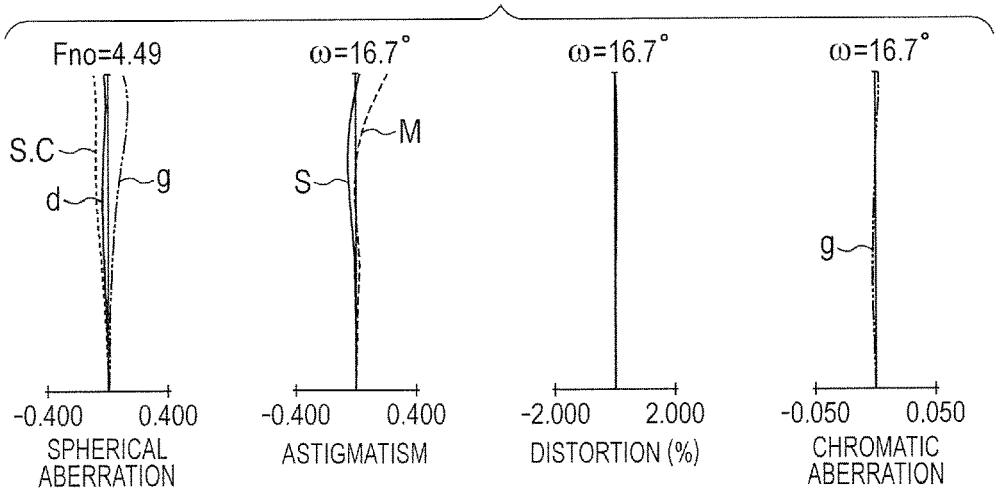
FIG. 2A is aberration diagrams of the zoom lens of Example 1 at the wide angle end when focused at infinity.
Figure 2B:
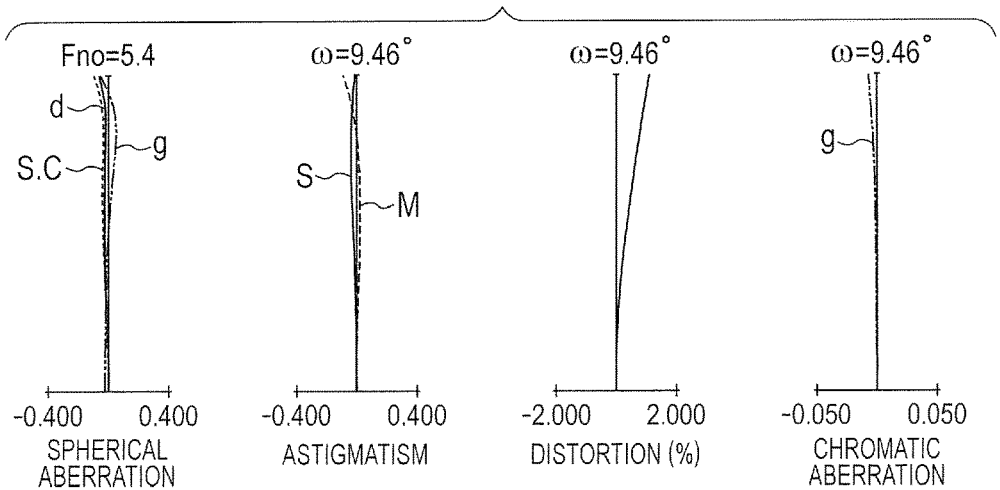
FIG. 2B is aberration diagrams of the zoom lens of Example 1 at an intermediate zoom position when focused at infinity.
Figure 2C:
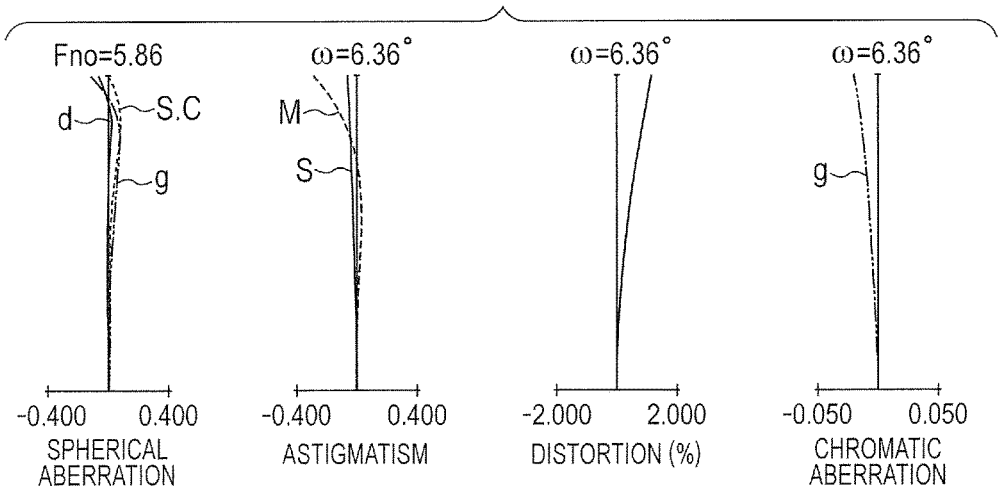
FIG. 2C is aberration diagrams of the zoom lens of Example 1 at the telephoto end when focused at infinity.

FIG. 1A and FIG. 1B are lens cross-sectional views of a zoom lens according to Example 1 of the present invention at a wide angle end and a telephoto end (long focal length end), respectively. FIG. 2A, FIG. 2B, and FIG. 2C are aberration diagrams of the zoom lens of Example 1 at the wide angle end, an intermediate zoom position, and the telephoto end when focused at infinity distance, respectively. FIG. 3A, FIG. 3B, and FIG. 3C are aberration diagrams of the zoom lens of Example 1 at the wide angle end, the intermediate zoom position, and the telephoto end when focused at the closest distance, respectively.

Here, the closest distance corresponds to an imaging lateral magnification of −0.238 at the wide angle end, an imaging lateral magnification of −0.438 at the intermediate zoom position, and an imaging lateral magnification of −0.694 at the telephoto end. The zoom lens of Example 1 has a zoom ratio of 2.69, and an aperture ratio (F-number) of from about 4.49 to about 5.86.

Figure 5A:
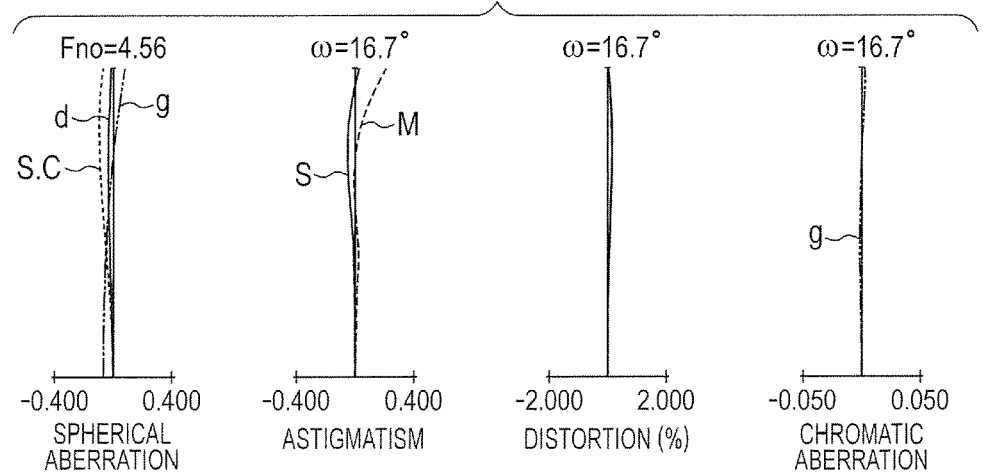
FIG. 5A is aberration diagrams of the zoom lens of Example 2 at the wide angle end when focused at infinity.
Figure 5B:
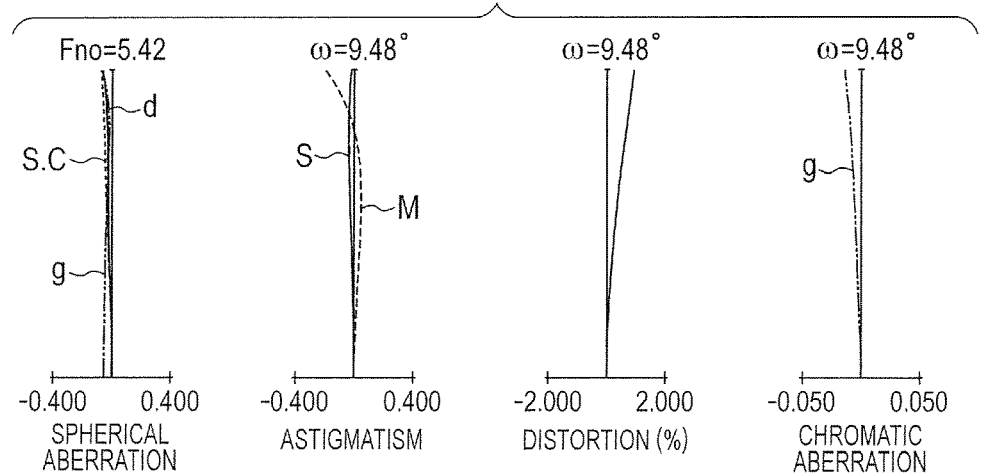
FIG. 5B is aberration diagrams of the zoom lens of Example 2 at the intermediate zoom position when focused at infinity.
Figure 5C:
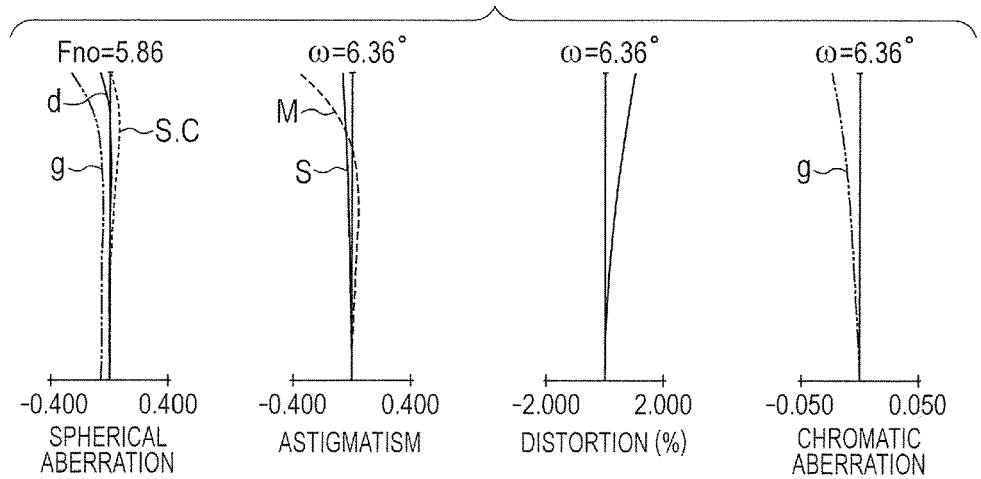
FIG. 5C is aberration diagrams of the zoom lens of Example 2 at the telephoto end when focused at infinity.
Figure 6A:
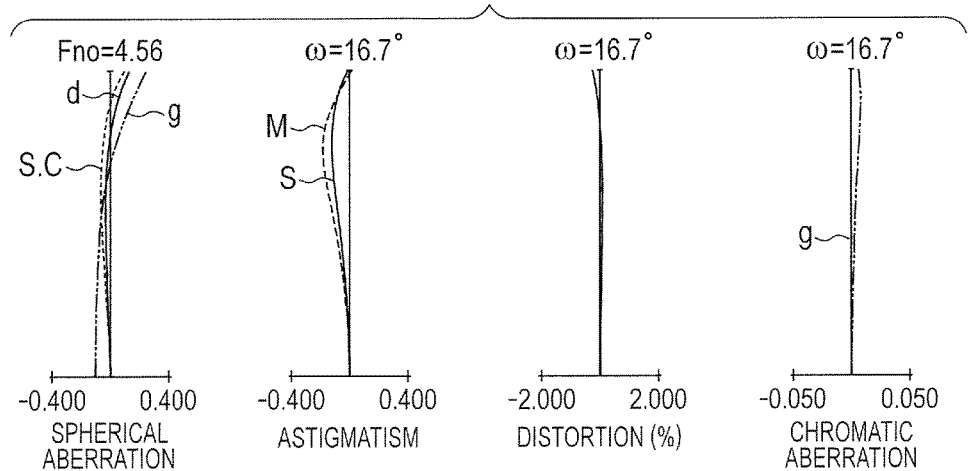
FIG. 6A is aberration diagrams of the zoom lens of Example 2 at the wide angle end when focused at close distance.
Figure 6B:
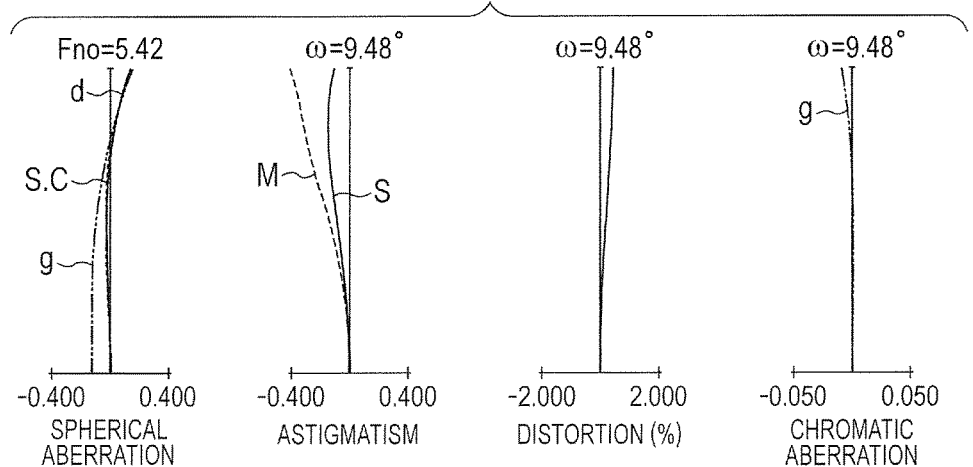
FIG. 6B is aberration diagrams of the zoom lens of Example 2 at the intermediate zoom position when focused at close distance.
Figure 6C:
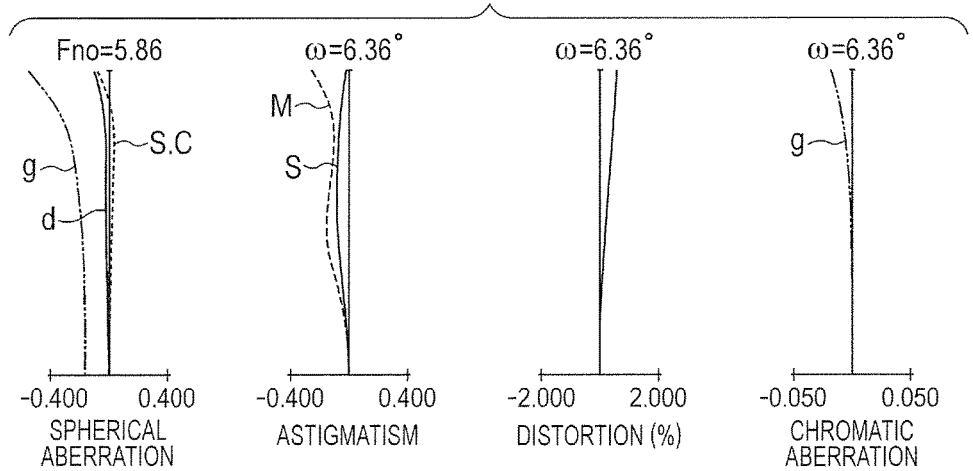
FIG. 6C is aberration diagrams of the zoom lens of Example 2 at the telephoto end when focused at close distance.

FIG. 4A and FIG. 4B are lens cross-sectional views of a zoom lens according to Example 2 of the present invention at the wide angle end and the telephoto end, respectively. FIG. 5A, FIG. 5B, and FIG. 5C are aberration diagrams of the zoom lens of Example 2 at the wide angle end, the intermediate zoom position, and the telephoto end when focused at infinity distance, respectively. FIG. 6A, FIG. 6B, and FIG. 6C are aberration diagrams of the zoom lens of Example 2 at the wide angle end, the intermediate zoom position, and the telephoto end when focused at the closest distance, respectively.

The closest distance corresponds to an imaging lateral magnification of −0.222 at the wide angle end, an imaging lateral magnification of −0.398 at the intermediate zoom position, and an imaging lateral magnification of −0.630 at the telephoto end. The zoom lens of Example 2 has a zoom ratio of 2.69, and an aperture ratio of from about 4.56 to about 5.86.

Figure 8A:
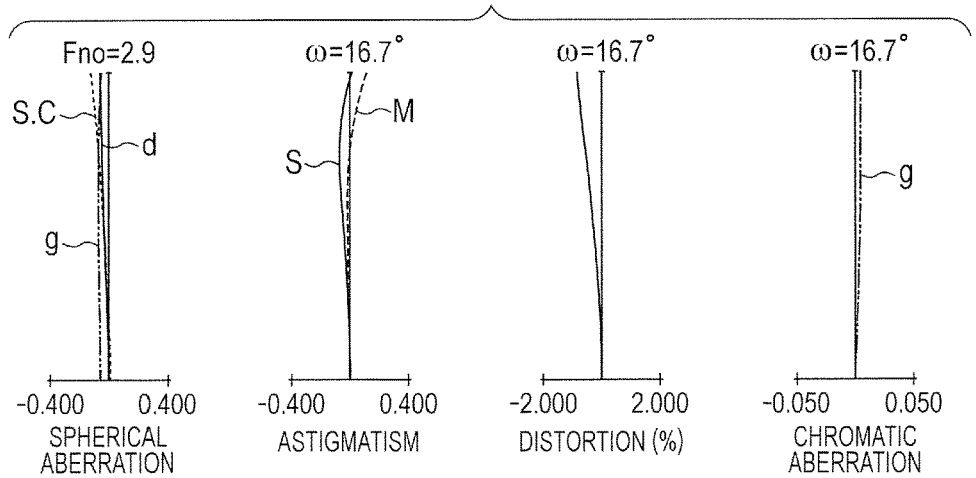
FIG. 8A is aberration diagrams of the zoom lens of Example 3 at the wide angle end when focused at infinity.
Figure 8B:
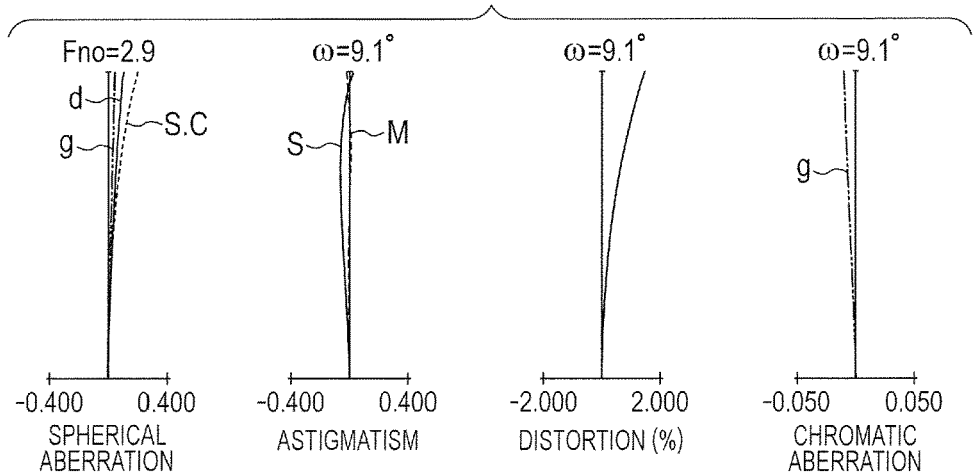
FIG. 8B is aberration diagrams of the zoom lens of Example 3 at the intermediate zoom position when focused at infinity.
Figure 8C:
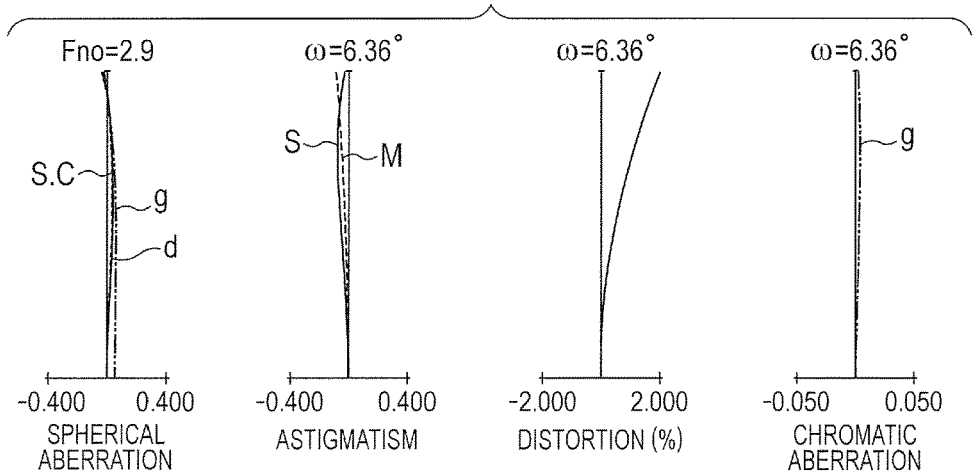
FIG. 8C is aberration diagrams of the zoom lens of Example 3 at the telephoto end when focused at infinity.
Figure 9A:
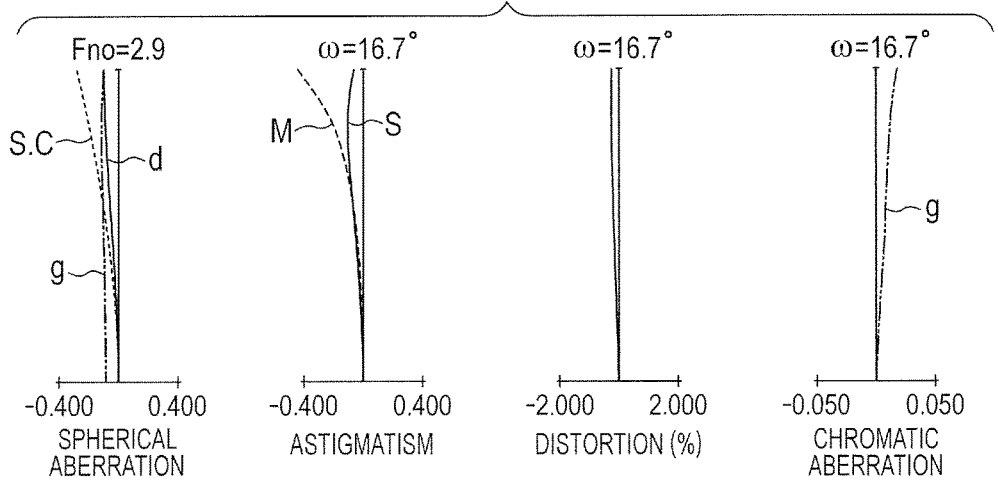
FIG. 9A is aberration diagrams of the zoom lens of Example 3 at the wide angle end when focused at close distance.
Figure 9B:
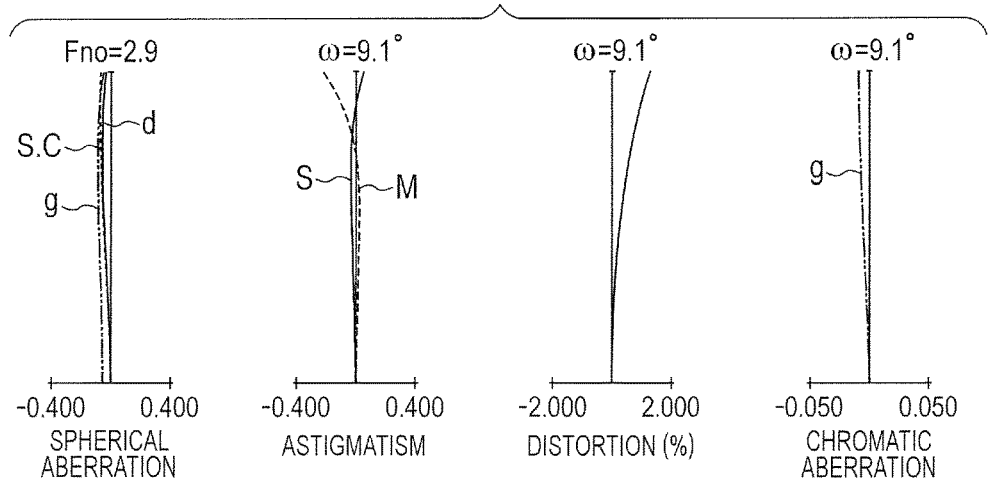
FIG. 9B is aberration diagrams of the zoom lens of Example 3 at the intermediate zoom position when focused at close distance.
Figure 9C:
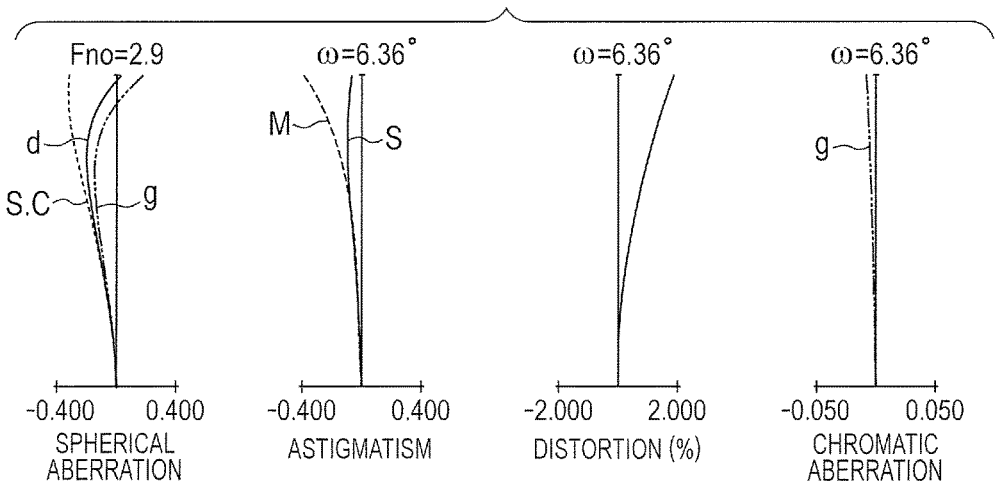
FIG. 9C is aberration diagrams of the zoom lens of Example 3 at the telephoto end when focused at close distance.

FIG. 7A and FIG. 7B are lens cross-sectional views of a zoom lens according to Example 3 of the present invention at the wide angle end and the telephoto end, respectively. FIG. 8A, FIG. 8B, and FIG. 8C are aberration diagrams of the zoom lens of Example 3 at the wide angle end, the intermediate zoom position, and the telephoto end when focused at infinity distance, respectively. FIG. 9A, FIG. 9B, and FIG. 9C are aberration diagrams of the zoom lens of Example 3 at the wide angle end, the intermediate zoom position, and the telephoto end when focused at the closest distance, respectively.

The closest distance corresponds to an imaging lateral magnification of −0.094 at the wide angle end, an imaging lateral magnification of −0.168 at the intermediate zoom position, and an imaging lateral magnification of −0.250 at the telephoto end. The zoom lens of Example 3 has a zoom ratio of 2.69, and an aperture ratio of 2.90.

Figure 11A:
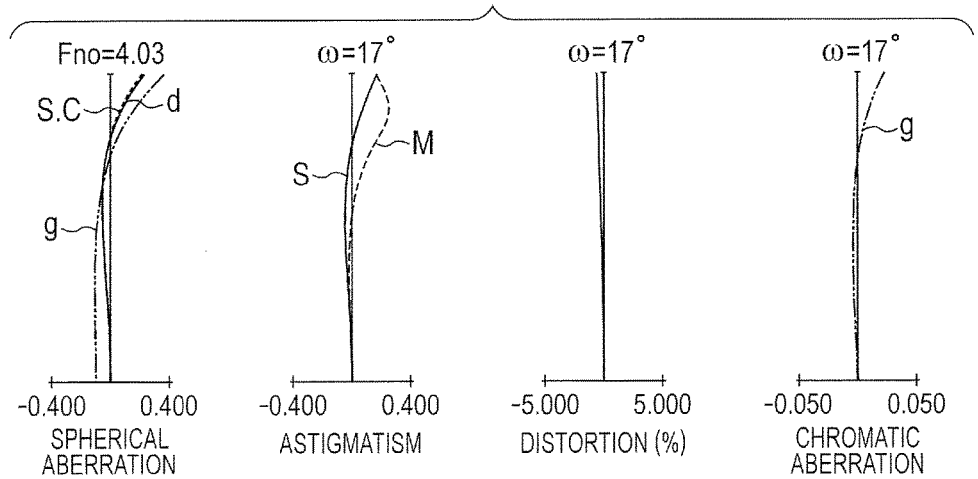
FIG. 11A is aberration diagrams of the zoom lens of Example 4 at the wide angle end when focused at infinity.
Figure 11B:
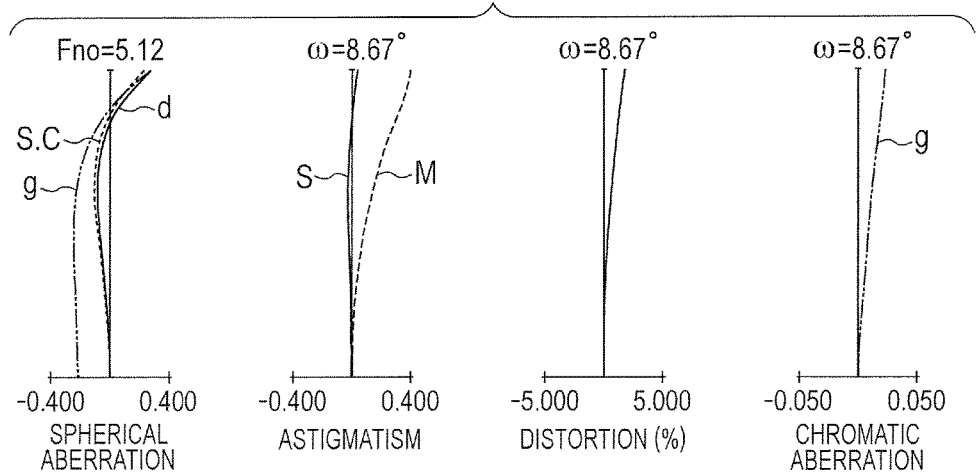
FIG. 11B is aberration diagrams of the zoom lens of Example 4 at the intermediate zoom position when focused at infinity.
Figure 11C:
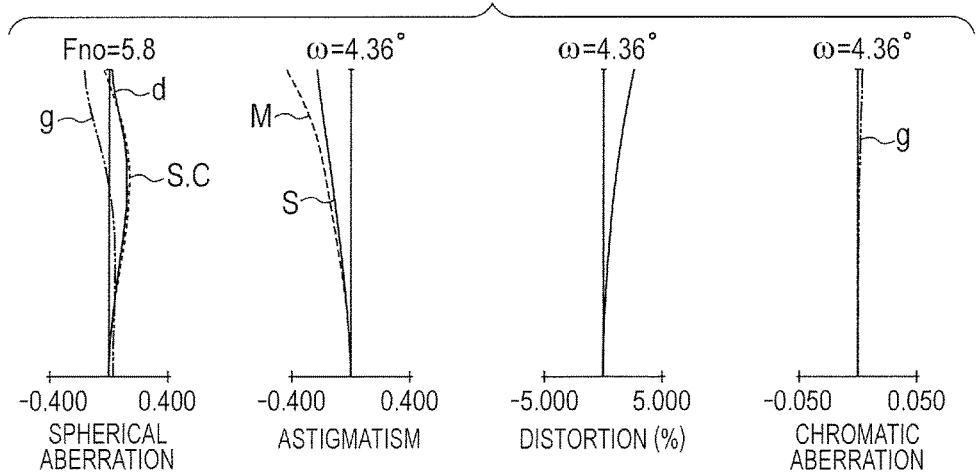
FIG. 11C is aberration diagrams of the zoom lens of Example 4 at the telephoto end when focused at infinity.
Figure 12A:
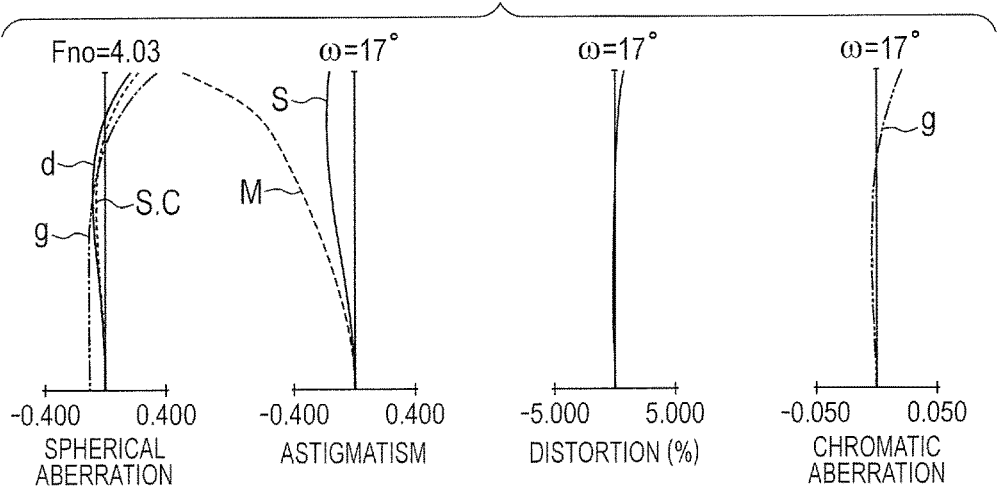
FIG. 12A is aberration diagrams of the zoom lens of Example 4 at the wide angle end when focused at close distance.
Figure 12B:
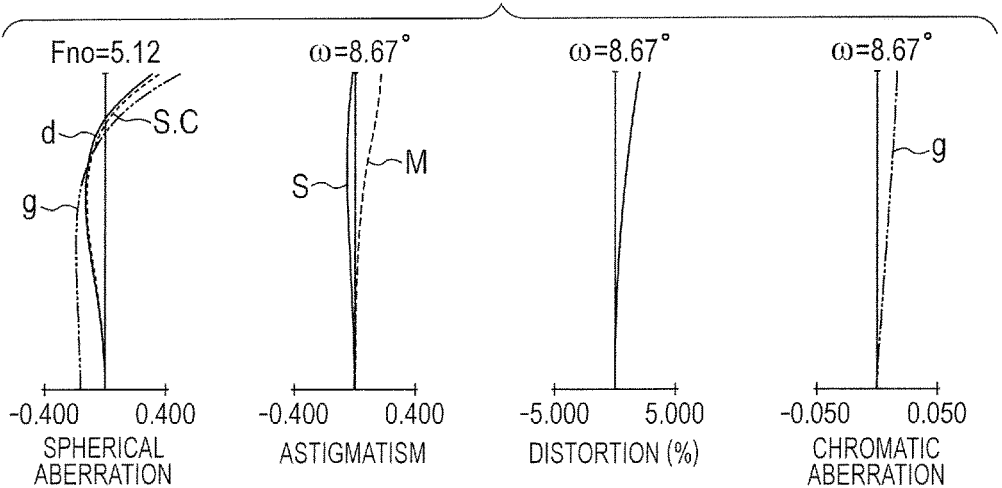
FIG. 12B is aberration diagrams of the zoom lens of Example 4 at the intermediate zoom position when focused at close distance.
Figure 12C:
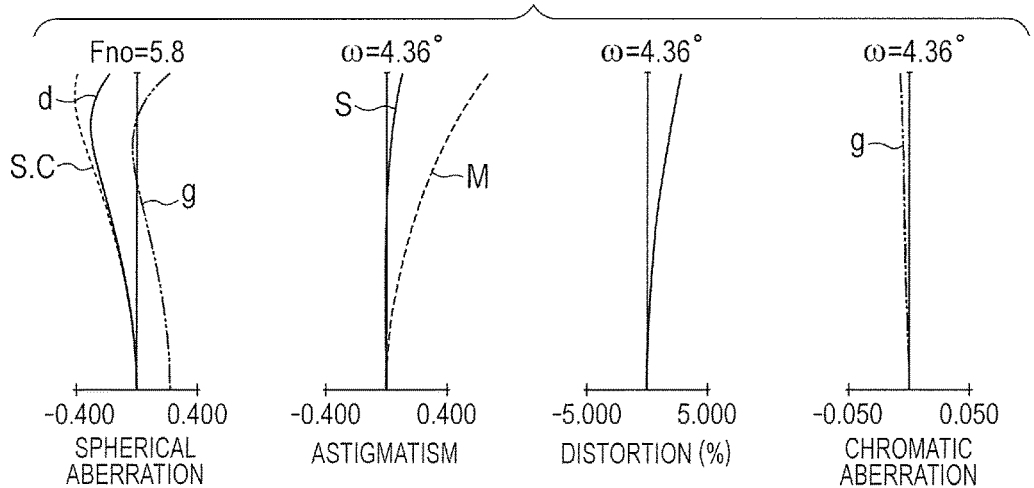
FIG. 12C is aberration diagrams of the zoom lens of Example 4 at the telephoto end when focused at close distance.

FIG. 10A and FIG. 10B are lens cross-sectional views of a zoom lens according to Example 4 of the present invention at the wide angle end and the telephoto end, respectively. FIG. 11A, FIG. 11B, and FIG. 11C are aberration diagrams of the zoom lens of Example 4 at the wide angle end, the intermediate zoom position, and the telephoto end when focused at infinity distance, respectively. FIG. 12A, FIG. 12B, and FIG. 12C are aberration diagrams of the zoom lens of Example 4 at the wide angle end, the intermediate zoom position, and the telephoto end when focused at the closest distance, respectively.

The closest distance corresponds to an imaging lateral magnification of −0.087 at the wide angle end, an imaging lateral magnification of −0.182 at the intermediate zoom position, and an imaging lateral magnification of −0.392 at the telephoto end. The zoom lens of Example 4 has a zoom ratio of 4.00, and an aperture ratio of from about 4.03 to about 5.80.

Figures 13A, 13B:
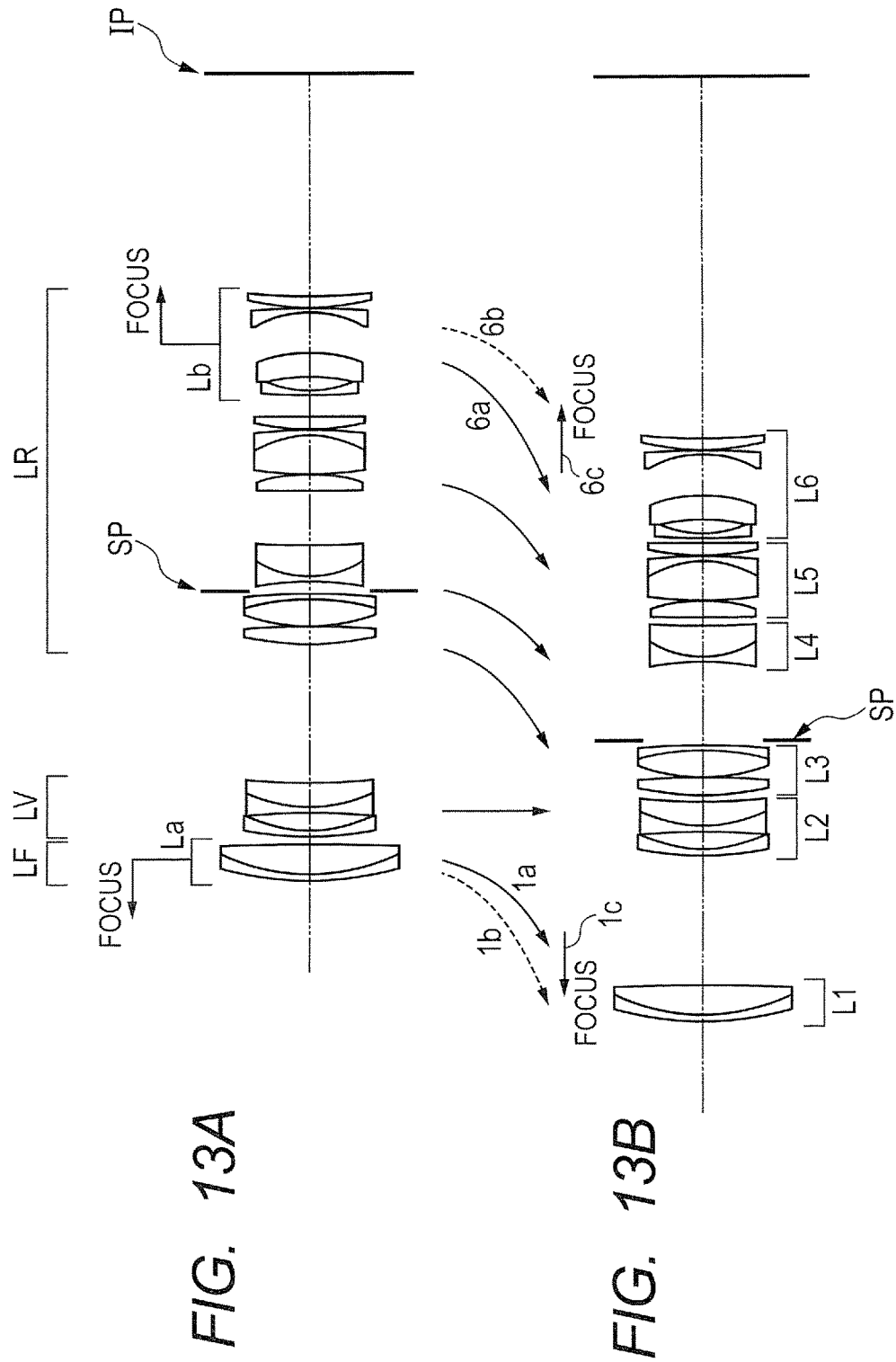
FIG. 13A is a lens cross-sectional view of a zoom lens according to Example 5 of the present invention at the wide angle end.
FIG. 13B is a lens cross-sectional view of the zoom lens of Example 5 at the telephoto end.
Figure 14A:
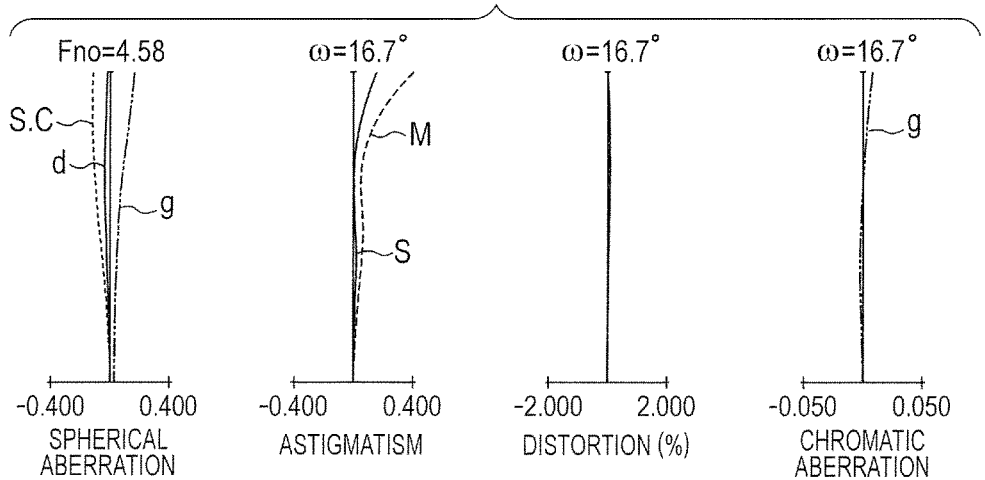
FIG. 14A is aberration diagrams of the zoom lens of Example 5 at the wide angle end when focused at infinity.
Figure 14B:
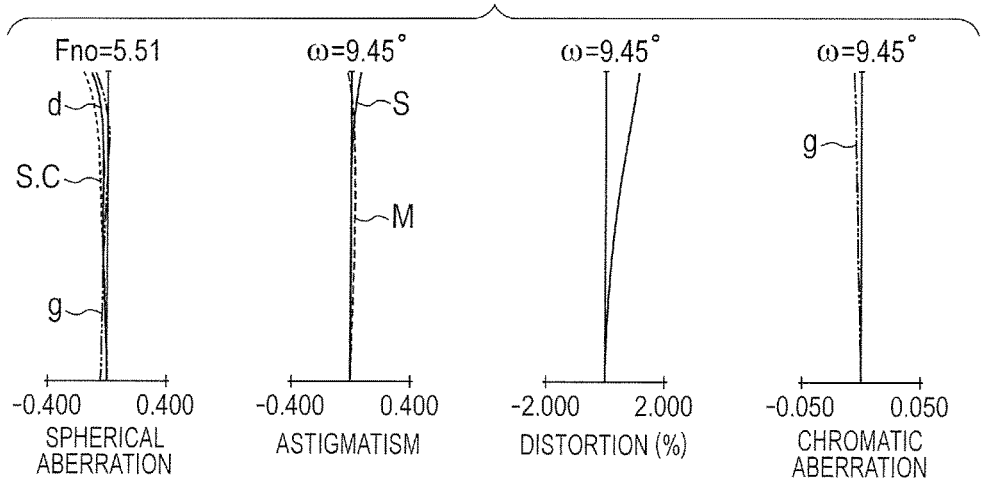
FIG. 14B is aberration diagrams of the zoom lens of Example 5 at the intermediate zoom position when focused at infinity.
Figure 14C:
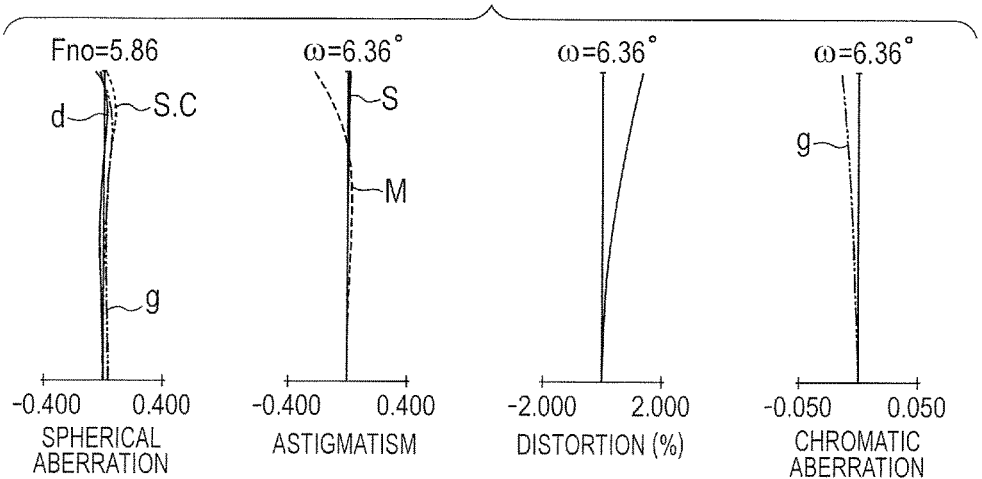
FIG. 14C is aberration diagrams of the zoom lens of Example 5 at the telephoto end when focused at infinity.
Figure 15A:
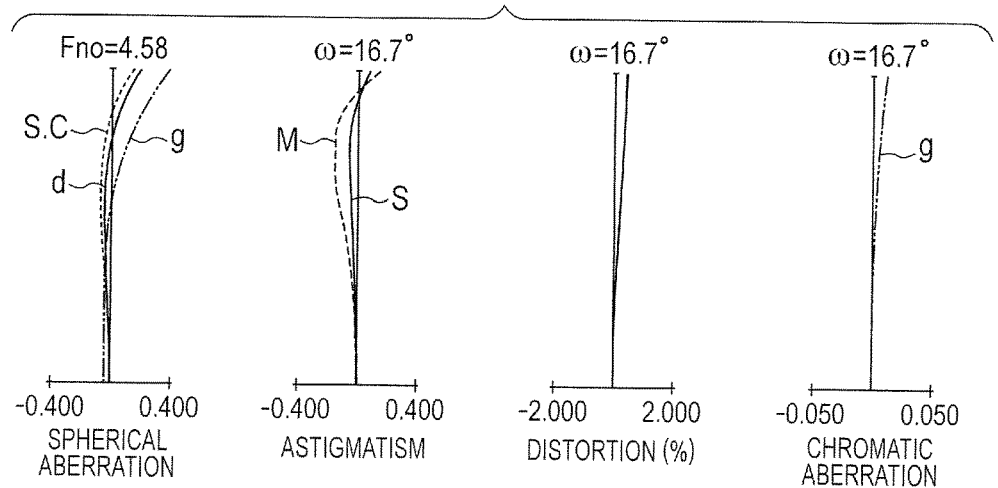
FIG. 15A is aberration diagrams of the zoom lens of Example 5 at the wide angle end when focused at close distance.
Figure 15B:
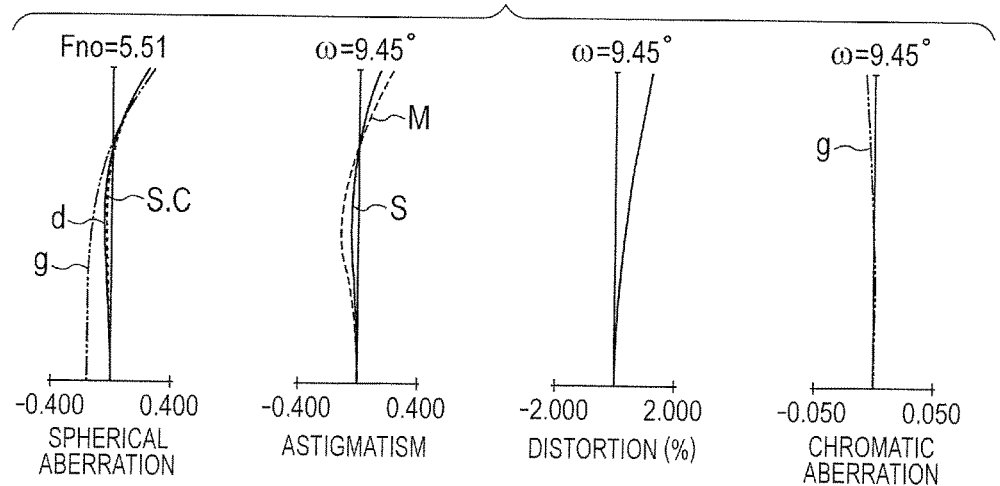
FIG. 15B is aberration diagrams of the zoom lens of Example 5 at the intermediate zoom position when focused at close distance.
Figure 15C:
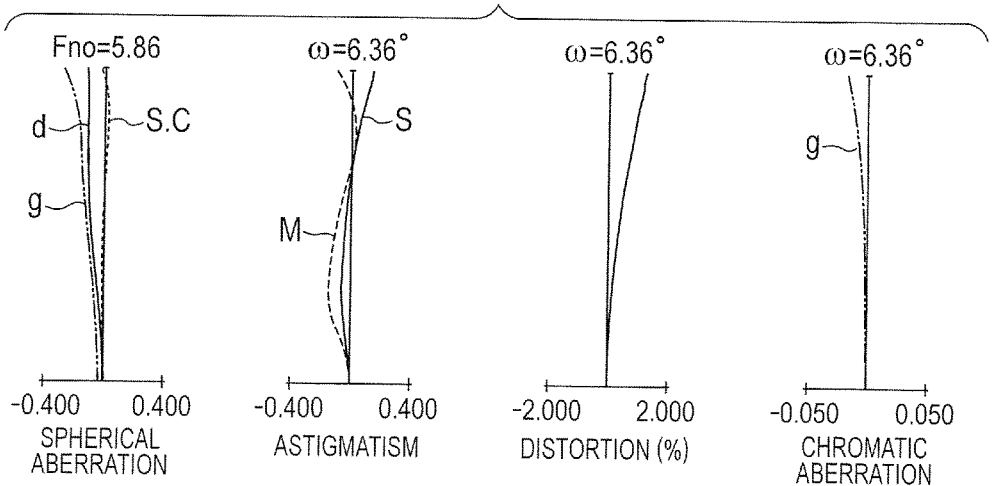
FIG. 15C is aberration diagrams of the zoom lens of Example 5 at the telephoto end when focused at close distance.

FIG. 13A and FIG. 13B are lens cross-sectional views of a zoom lens according to Example 5 of the present invention at the wide angle end and the telephoto end, respectively. FIG. 14A, FIG. 14B, and FIG. 14C are aberration diagrams of the zoom lens of Example 5 at the wide angle end, the intermediate zoom position, and the telephoto end when focused at infinity distance, respectively. FIG. 15A, FIG. 15B, and FIG. 15C are aberration diagrams of the zoom lens of Example 5 at the wide angle end, the intermediate zoom position, and the telephoto end when focused at the closest distance, respectively.

The closest distance corresponds to an imaging lateral magnification of −0.215 at the wide angle end, an imaging lateral magnification of −0.421 at the intermediate zoom position, and an imaging lateral magnification of −0.682 at the telephoto end. The zoom lens of Example 5 has a zoom ratio of 2.69, and an aperture ratio of from about 4.58 to about 5.86.

Figure 17A:
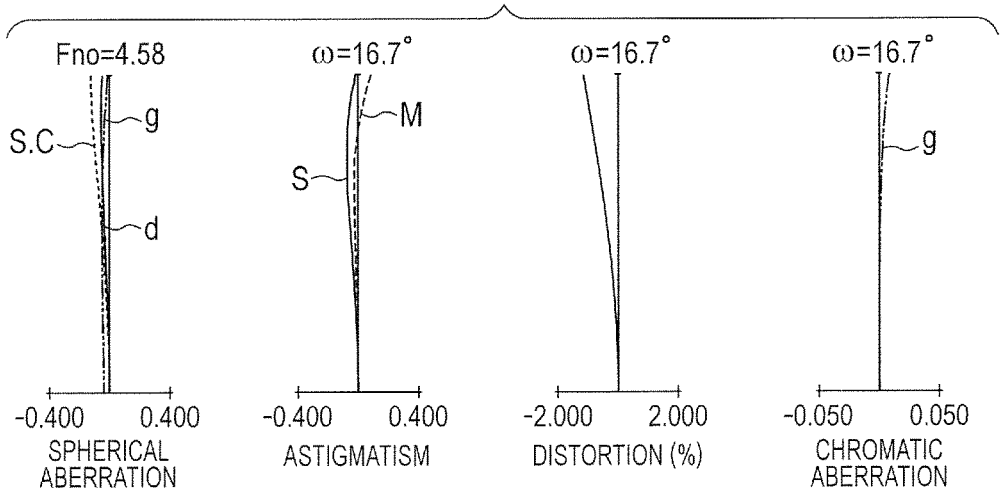
FIG. 17A is aberration diagrams of the zoom lens of Example 6 at the wide angle end when focused at infinity.
Figure 17B:
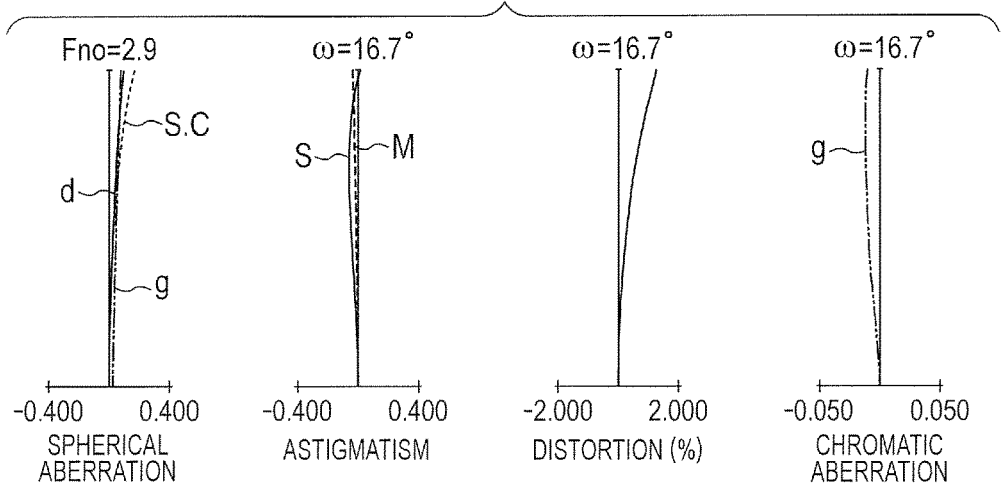
FIG. 17B is aberration diagrams of the zoom lens of Example 6 at the intermediate zoom position when focused at infinity.
Figure 17C:
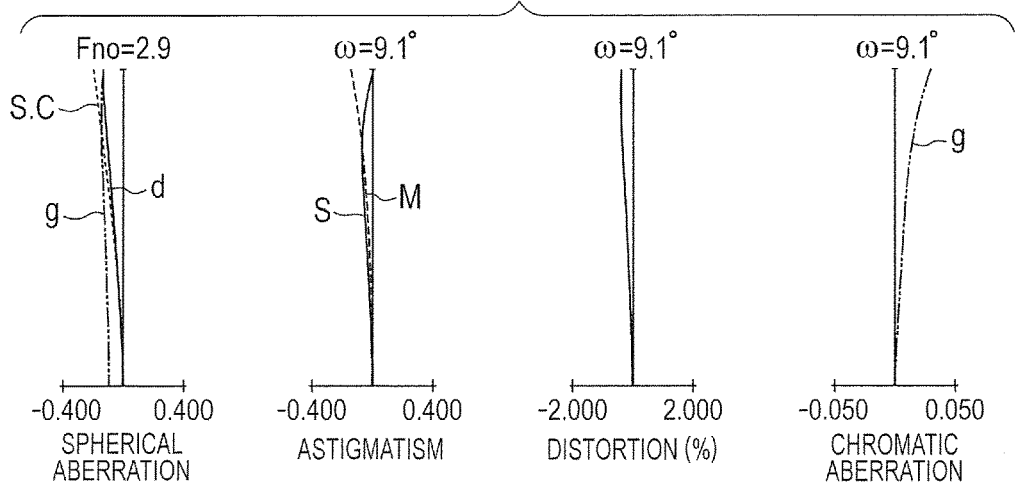
FIG. 17C is aberration diagrams of the zoom lens of Example 6 at the telephoto end when focused at infinity.
Figure 18A:
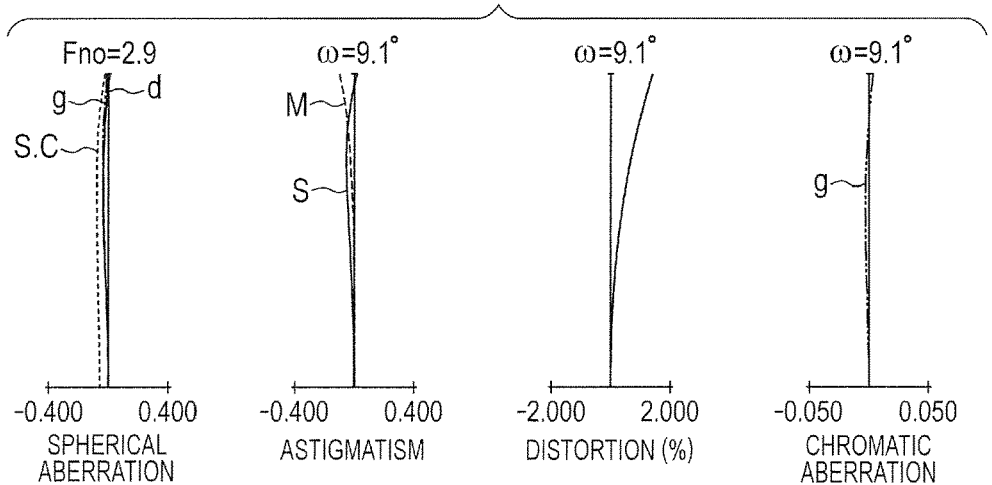
FIG. 18A is aberration diagrams of the zoom lens of Example 6 at the wide angle end when focused at close distance.
Figure 18B:
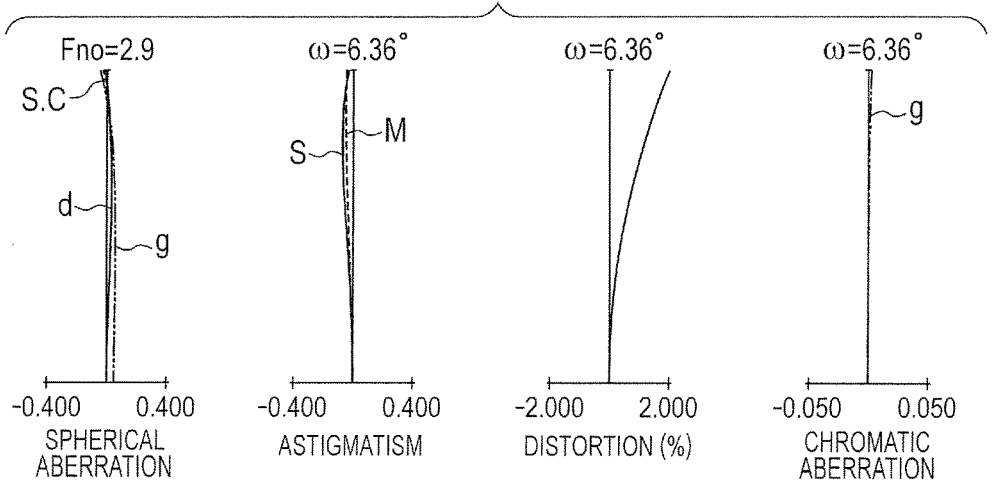
FIG. 18B is aberration diagrams of the zoom lens of Example 6 at the intermediate zoom position when focused at close distance.
Figure 18C:
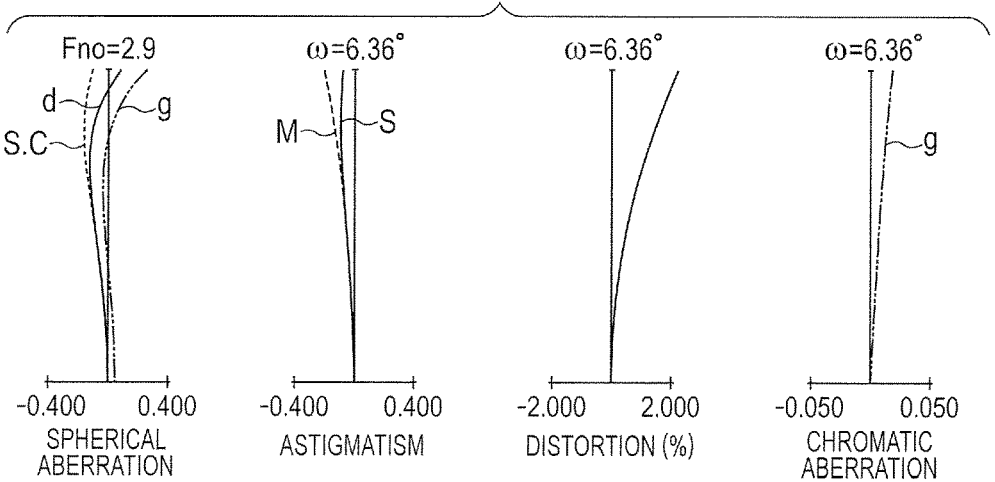
FIG. 18C is aberration diagrams of the zoom lens of Example 6 at the telephoto end when focused at close distance.

FIG. 16A and FIG. 16B are lens cross-sectional views of a zoom lens according to Example 6 of the present invention at the wide angle end and the telephoto end, respectively. FIG. 17A, FIG. 17B, and FIG. 17C are aberration diagrams of the zoom lens of Example 6 at the wide angle end, the intermediate zoom position, and the telephoto end when focused at infinity distance, respectively. FIG. 18A, FIG. 18B, and FIG. 18C are aberration diagrams of the zoom lens of Example 6 at the wide angle end, the intermediate zoom position, and the telephoto end when focused at the closest distance, respectively.

The closest distance corresponds to an imaging lateral magnification of −0.092 at the wide angle end, an imaging lateral magnification of −0.171 at the intermediate zoom position, and an imaging lateral magnification of −0.250 at the telephoto end. The zoom lens of Example 6 has a zoom ratio of 2.69, and an aperture ratio of about 2.90.

Figure 19:
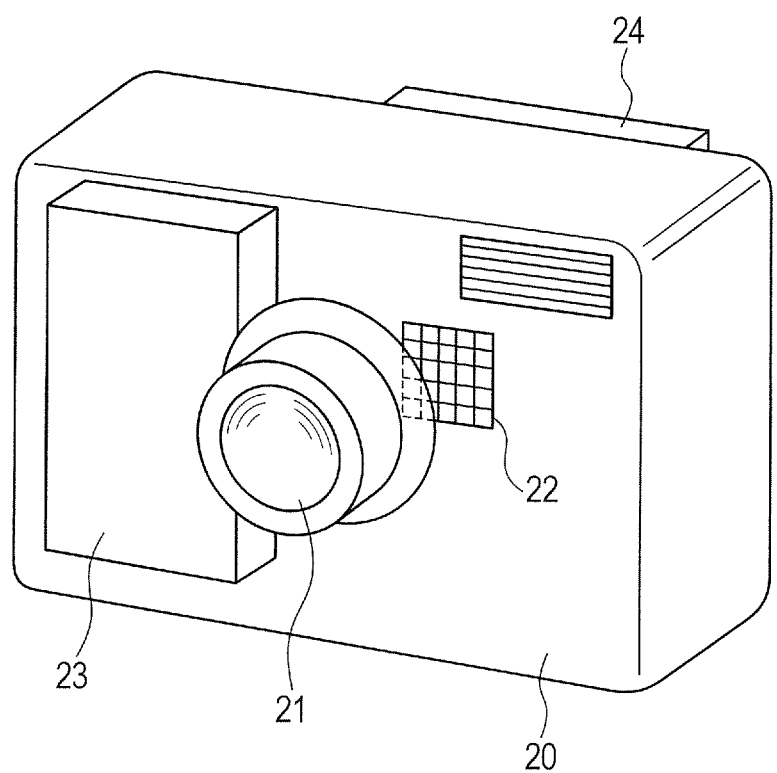
FIG. 19 is a schematic diagram of a main part of an image pickup apparatus according to the present invention.

FIG. 19 is a schematic diagram of a main part of a digital still camera (image pickup apparatus) including the zoom lens according to the present invention.

The zoom lens of each Example is an image pickup optical system that is used in an image pickup apparatus, for example, a video camera, a digital still camera, a silver-halide film camera, or a TV camera. The zoom lens of each Example may be used as a projection optical system for a projection device (projector).

In the lens cross-sectional views, the left side corresponds to the object side (front side), and the right side corresponds to the image side (rear side). Further, in the lens cross-sectional views, a front lens group LF includes one or more lens units having a positive refractive power. A magnification-varying lens unit LV includes a lens unit having a negative refractive power and being configured to move during zooming. A rear lens group LR has a positive refractive power, and includes a plurality of lens units. An i-th lens unit is represented by Li when the order of a lens unit counted from the object side is represented by i.

An aperture stop is represented by SP. An image plane is represented by IP. The image plane IP corresponds to an image pickup surface of an image pickup element (photo-electric conversion element), for example, a CCD sensor or a CMOS sensor, when the zoom lens is used as an image pickup optical system of a video camera or a digital camera. Further, the image plane IP corresponds to a film surface when the zoom lens is used as an image pickup optical system of a silver-halide film camera. The arrows indicate the movement loci of the respective lens units during zooming (varying magnification) from the wide angle end to the telephoto end. The arrows related to focusing indicate the movement directions of the respective lens units during focusing from infinity to short distance.

Among the aberration diagrams, in the spherical aberration diagrams, a solid line d indicates a d-line (wavelength of 587.6 nm), a two-dot chain line g indicates a g-line (wavelength of 435.8 nm), and a dotted line S.C indicates a sine condition. In the astigmatism diagrams, a solid line S indicates a sagittal image plane at the d-line, and a dotted line M indicates a meridional image plane at the d-line. Distortion is shown about the d-line. In the lateral chromatic aberration diagrams, g indicates the g-line. In Examples described below, the wide angle end and the telephoto end respectively refer to zoom positions when a lens unit for magnification varying is located at both ends of a mechanically movable range thereof on an optical axis.

Among focusing systems, in general, a front lens focusing system in which focusing is performed with a first lens unit (front lens unit) arranged on an object side has relatively small aberration variation during focusing. Further, in a positive lead type zoom lens employing the front lens focusing system, an interval between a varying magnification lens unit and a first lens unit is increased during focusing, and hence an image magnification is easily increased due to a varying-magnification effect.

However, the movement amount of the first lens unit during focusing is increased at the wide angle end, and hence it is difficult to obtain a sufficient peripheral light amount at the wide angle end in short distance photography. Further, the effective diameter of the front lens (effective diameter of first lens unit) is significantly increased in order to obtain a sufficient peripheral light amount.

There is known an inner focusing system or a rear focusing system (hereinafter referred to as "rear focusing system") in which focusing is performed with the use of a second lens unit and subsequent lens units, in addition to the front lens focusing system. This rear focusing system in which the movement amounts of the lens units during focusing are easily reduced is advantageous in downsizing of the entire system. However, aberration variation during focusing is large, and it is difficult to reduce aberration variation during focusing. Further, when a zoom lens employing the rear focusing system is configured to perform focusing at a shorter distance in order to increase the maximum image magnification, the position sensitivity of the focusing units tends to be significantly increased.

In order to reduce aberration variation during focusing in the rear focusing system, it is effective to employ a floating system in which a plurality of lens units are configured to move by different movement amounts during focusing. The floating system is known as including one of the plurality of lens units as a main focusing unit, and the other thereof as an aberration correcting lens unit. Here, in order to reduce a photography possible distance and increase the maximum image magnification, it is important that the aberration correcting lens unit also has a focusing function.

The present invention employs the rear focusing system and the floating system that uses, during focusing, one lens unit as a main focusing unit, and another lens unit as an aberration correcting lens unit for correcting aberration that varies during focusing. The aberration correcting lens unit is a front lens unit or a part thereof in the front lens focusing system, and thus has a focusing function. Accordingly, photography distance is easily reduced.

Further, by virtue of the feature of the front lens focusing system, the image magnification is easily increased by the varying-magnification effect. Further, the movement amount of each lens unit during focusing is appropriately set to reduce aberration variation accompanying focusing.

In addition, in the present invention, in order to obtain a sufficient peripheral light amount at the wide angle end in short distance photography, the movement amount of each focusing unit is appropriately set such that the movement amount of the lens unit in the front lens focusing system is not excessively increased at the wide angle end. In contrast, at the telephoto end, the movement amount of each focusing unit is appropriately set such that the movement amount of the lens unit in the front lens focusing system is increased to make use of the feature of the front lens focusing system in order to increase the image magnification as much as possible.

Next, the configuration of the zoom lens of the present invention is described in detail. In the zoom lens according to each Example of the present invention, a lens unit having a positive refractive power in the front lens group LF is referred to as a focusing unit La, and a lens unit having a positive refractive power or a negative refractive power in the rear lens group LR is referred to as a focusing unit Lb. The focusing unit La is configured to move toward the object side and the focusing unit Lb is configured to move toward the object side or the image side, during focusing from infinity to close distance.

The movement amount of the focusing unit La at the wide angle end in focusing from infinity to the closest distance is represented by Maw, and the movement amount of the focusing unit La at the telephoto end in focusing from infinity to the closest distance is represented by Mat. In this case, the following conditional expression is satisfied:

$$0.1 < Maw/Mat < 0.6 \qquad (1).$$

In the zoom lens of each Example, the object-side lens unit or the image-side lens unit of the varying magnification lens unit is used in focusing in order to reduce aberration variation during focusing. Further, the focusing unit La is configured to move toward the object side during focusing from infinity to close distance to exhibit a varying magnification function during focusing so that the image magnification may be increased while working distance is provided. Here, the working distance is a distance on an optical axis from the vertex of the object-side lens surface of the lens closest to the object side to the surface of an object.

The movement amount during focusing is defined as a distance on the optical axis direction from a position of the focusing unit on the optical axis during focusing at infinity, which is a reference, to a position that the focusing unit reaches by moving by the largest amount in an entire effective object distance range of photography.

Conditional Expression (1) defines a ratio of the movement amount of the focusing unit La at the wide angle end to the movement amount of the focusing unit La at the telephoto end, during focusing. When the movement amount of the focusing unit La at the wide angle end is increased to exceed the upper limit, it is difficult to obtain a sufficient peripheral light amount at the wide angle end, which is not preferred. When the movement amount of the focusing unit La at the wide angle end is reduced to fall below the lower limit, an aberration correcting effect is not sufficiently provided by the focusing unit La, and aberration variation during focusing is increased, which is not preferred.

It is more preferred to set the numerical ranges of Conditional Expression (1) as follows.

$$0.15 < Maw/Mat < 0.45 \qquad (1a)$$

As described above, according to the present invention, there can be provided a compact zoom lens that is configured to achieve a high image magnification at the telephoto end, and has small aberration variation during focusing over an entire zoom range thereof and high optical characteristics over an entire object distance thereof.

In each Example, it is preferred that one or more conditional expressions described below be satisfied. The movement amount of the focusing unit Lb at the wide angle end during focusing from infinity to the closest distance is represented by Mbw, and the movement amount of the focusing unit Lb at the telephoto end during focusing from infinity to the closest distance is represented by Mbt. The focal length of the focusing unit La is represented by fa, and the focal length of the entire system at the telephoto end is represented by ft. The focal length of the focusing unit Lb is represented by fb. The focal length of the front lens group LF at the wide angle end is represented by ffw.

The focal length of the magnification-varying lens unit LV is represented by fv, and the focal length of the entire system at the wide angle end is represented by fw. An interval between the front lens group LF and the magnification-varying lens unit LV at the wide angle end is represented by Lfvw, and an interval between the front lens group LF and the magnification-varying lens unit LV at the telephoto end is represented by Lfvt. The focal length of the rear lens group LR at the wide angle end is represented by frw. An imaging lateral magnification at the wide angle end when focused at the closest distance is represented by βMODw, and an imaging lateral magnification at the telephoto end when focused at the closest distance is represented by βMODt. In this case, it is preferred that one or more conditional expressions described below be satisfied.

$$0.15 < Mbw/Mbt < 0.80 \quad (2)$$

$$0.3 < Maw/Mbw < 5.0 \quad (3)$$

$$0.5 < Mat/Mbt < 7.0 \quad (4)$$

$$0.3 < fa/ft < 1.1 \quad (5)$$

$$0.10 < |fb|/ft < 0.80 \quad (6)$$

$$0.30 < ffw/ft < 0.70 \quad (7)$$

$$0.30 < |fv|/fw < 0.65 \quad (8)$$

$$0.10 < (Lfvt - Lfvw)/fw < 0.50 \quad (9)$$

$$0.90 < fa/ffw < 2.00 \quad (10)$$

$$0.5 < frw/fw < 1.0 \quad (11)$$

$$0.95 < (\beta MODt/\beta MODw)/(ft/fw) < 1.20 \quad (12)$$

Conditional Expression (2) defines a ratio of the movement amount of the focusing unit Lb at the wide angle end to the movement amount of the focusing unit Lb at the telephoto end, during focusing. When the movement amount of the focusing unit Lb at the wide angle end is increased to exceed the upper limit, at the wide angle end, aberration variation during focusing, particularly variation in field curvature, is increased, which is not preferred. When the movement amount of the focusing unit Lb at the wide angle end is reduced to fall below the lower limit, the movement amount of the focusing unit La is increased, and it is difficult to obtain a sufficient peripheral light amount at the wide angle end, which is not preferred.

Conditional Expression (3) defines a ratio of the movement amount of the focusing unit La at the wide angle end to the movement amount of the focusing unit Lb at the wide angle end, during focusing. When the movement amount of the focusing unit La is increased to exceed the upper limit, it is difficult to obtain a sufficient peripheral light amount at the wide angle end, which is not preferred. When the movement amount of the focusing unit La is reduced to fall below the lower limit, at the wide angle end, aberration variation during focusing, particularly variation in field curvature, is increased, which is not preferred.

Conditional Expression (4) defines a ratio of the movement amount of the focusing unit La at the telephoto end to the movement amount of the focusing unit Lb at the telephoto end, during focusing. When the movement amount of the focusing unit La is increased to exceed the upper limit, a mechanical mechanism is complicated to upsize the lens system, which is not preferred. When the movement amount of the focusing unit La is reduced to fall below the lower limit, it is difficult to provide sufficient working distance, which is not preferred.

Conditional Expression (5) defines the focal length of the focusing unit La. When the focal length of the focusing unit La is increased to exceed the upper limit, the movement amount of the focusing unit La during focusing is increased to upsize the lens system, which is not preferred. When the focal length of the focusing unit La is reduced to fall below the lower limit, at the telephoto end, it is difficult to correct various aberrations, particularly spherical aberration, axial chromatic aberration, and lateral chromatic aberration, which is not preferred.

Conditional Expression (6) defines the focal length of the focusing unit Lb. When the absolute value of the focal length of the focusing unit Lb is increased to exceed the upper limit, the movement amount of the focusing unit Lb during focusing is increased to upsize the lens system, which is not preferred. When the absolute value of the focal length of the focusing unit Lb is reduced to fall below the lower limit, the position sensitivity of the focusing unit Lb is increased too much, and it is required that a mechanical mechanism configured to drive the focusing unit Lb be extremely accurate, which is not preferred.

Conditional Expression (7) defines the focal length of the front lens group LF. When the focal length of the front lens group LF is increased to exceed the upper limit, it is difficult to sufficiently reduce a telephoto ratio at the telephoto end to upsize the lens system, which is not preferred. When the focal length of the front lens group LF is reduced to fall below the lower limit, at the telephoto end, it is difficult to correct various aberrations, particularly coma and lateral chromatic aberration, which is not preferred.

Conditional Expression (8) defines the focal length of the magnification-varying lens unit LV. When the absolute value of the focal length of the magnification-varying lens unit LV is increased to exceed the upper limit, it is difficult to obtain a sufficient varying magnification ratio, which is not preferred. When the absolute value of the focal length of the magnification-varying lens unit LV is reduced to fall below the lower limit, it is difficult to reduce variation in various aberrations in zooming, particularly variation in spherical aberration and distortion in zooming, which is not preferred.

Conditional Expression (9) defines an air interval between the front lens group LF and the magnification-varying lens unit LV during varying magnification. When a change in air interval is increased to exceed the upper limit, the lens system is upsized, which is not preferred. When the change in air interval is reduced to fall below the lower limit, the magnification-varying lens unit LV less contributes to varying magnification, and it is difficult to obtain a sufficient varying magnification ratio, which is not preferred.

Conditional Expression (10) defines a ratio of the focal length of the focusing unit La to the focal length of the front lens group LF at the wide angle end. When the focal length of the focusing unit La is increased to exceed the upper limit, the movement amount of the focusing unit La during focusing is increased to upsize the lens system, which is not preferred. When the focal length of the focusing unit La is reduced to fall below the lower limit, during focusing, it is difficult to reduce aberration variation, particularly variation in lateral chromatic aberration at the telephoto end, which is not preferred.

Conditional Expression (11) defines the focal length of the rear lens group LR at the wide angle end. When the focal length of the rear lens group LR is increased to exceed the upper limit, it is difficult to obtain a long back focus at the wide angle end, which is not preferred. When the focal length of the rear lens group LR is reduced to fall below the lower limit, the lens total length is increased to upsize the lens system, which is not preferred.

Conditional Expression (12) defines a relationship of a ratio of the focal lengths of the entire system at the wide angle end and the telephoto end to a ratio between imaging lateral magnifications at the wide angle end and the telephoto end when focused at the closest distance (shortest photography distance). The ratio between the imaging lateral magnifications at the wide angle end and the telephoto end when focused at the closest distance corresponds to a varying magnification ratio on a short distance side. When the varying magnification ratio on the short distance side is different from a varying magnification ratio on a long distance side, the range of zooming changes in focusing operation, which is not preferred.

When a change in imaging lateral magnification when focused at the closest distance during zooming from the wide angle end to the telephoto end is larger than a change in focal length, and the ratio exceeds the upper limit of Conditional Expression (12), an image pickup angle of view is greatly changed on the short distance side, which is not preferred. When the change in imaging lateral magnification when focused at the closest distance during zooming from the wide angle end to the telephoto end is smaller than the change in focal length, and the ratio falls below the lower limit, the image pickup angle of view is changed by a too small amount on the short distance side, which is not preferred. It is more preferred to set the numerical value range of the conditional expressions (2) to (12) as follows.

$$0.20 < Mbw/Mbt < 0.65 \quad (2a)$$

$$0.55 < Maw/Mbw < 3.00 \quad (3a)$$

$$0.75 < Mat/Mbt < 5.00 \quad (4a)$$

$$0.40 < fa/ft < 0.95 \quad (5a)$$

$$0.18 < |fb|/ft < 0.75 \quad (6a)$$

$$0.35 < ffw/ft < 0.68 \quad (7a)$$

$$0.34 < |fv|/fw < 0.56 \quad (8a)$$

$$0.14 < (Lfvt - Lfvw)/fw < 0.45 \quad (9a)$$

$$0.99 < fa/ffw < 1.80 \quad (10a)$$

$$0.60 < frw/fw < 0.89 \quad (11a)$$

$$0.97 < (\beta MODt/\beta MODw)/(ft/fw) < 1.18 \quad (12a)$$

The technical meanings of Conditional Expressions (1a) to (12a) described above are similar to those of Conditional Expressions (1) to (12).

Next, the lens configuration of each Example is described. In Example 1, the front lens group LF, which includes one or more lens units, includes, in order from the object side to the image side, a first lens unit L1 having a positive refractive power and a second lens unit L2 having a positive refractive power. The focusing unit La is the second lens unit L2. The magnification-varying lens unit LV includes a third lens unit L3 having a negative refractive power.

The rear lens group LR, which includes a plurality of lens units, includes, in order from the object side to the image side, a fourth lens unit L4 having a positive refractive power, a fifth lens unit L5 having a negative refractive power, a sixth lens unit L6 having a positive refractive power, and a seventh lens unit L7 having a negative refractive power. The focusing unit Lb is the seventh lens unit L7. The focusing unit La having a positive refractive power, which is a part of the front lens group LF, is a floating lens unit. The focusing unit Lb having a negative refractive power, which is closest to the image side in the rear lens group LR, is a main focusing unit.

In this Example, the rear focusing system and the front lens focusing system are effectively combined. The focusing unit La and the focusing unit Lb, which are arranged in front of an aperture stop SP and behind the aperture stop SP, respectively, are configured to move in opposite directions by different movement amounts so that aberration variation during focusing may be effectively reduced.

In the lens cross-sectional view, a solid curve 2a and a dotted curve 2b related to the second lens unit L2 are movement loci for correcting image plane variation accompanying varying magnification when focused at an object at infinity and a close distance object (object in proximity), respectively. Further, at the telephoto end, focusing from the object at infinity to the close distance object is performed by the second lens unit L2 being moved forward (toward the object side), as indicated by an allow 2c.

A solid curve 7a and a dotted curve 7b related to the seventh lens unit L7 are movement loci for correcting image plane variation accompanying varying magnification when focused at the object at infinity and the close distance object, respectively. Further, at the telephoto end, focusing from the object at infinity to the close distance object is performed by the seventh lens unit L7 being moved backward (toward the image side), as indicated by an arrow 7c. A lens unit interval between each pair of adjacent lens units is changed during zooming.

The lens configuration of Example 2 is the same as that of Example 1, and hence an effect similar to that of Example 1 is provided. In Example 3, the front lens group LF and the magnification-varying lens unit LV are the same as those of Example 1. The rear lens group LR, which includes a plurality of lens units, includes, in order from the object side to the image side, a fourth lens unit L4 having a positive refractive power, and a fifth lens unit L5 having a positive refractive power. The focusing unit Lb is the fourth lens unit L4. The focusing unit La having a positive refractive power, which is a part of the front lens group LF, is a floating lens unit. The focusing unit Lb having a positive refractive power, which is on the object side in the rear lens group LR, is a main focusing unit.

In Example 3, the two lens units that are used in focusing are arranged to be relatively close to each other in the optical axis direction in order to simplify the mechanical mechanism. Also in Example 3, the rear focusing system and the front lens focusing system are effectively combined. The focusing unit La and the focusing unit Lb, which are arranged in front of an aperture stop SP and behind the aperture stop SP, respectively, are configured to move in opposite directions by different movement amounts so that aberration variation during focusing may be effectively reduced.

In the lens cross-sectional view, a solid curve 2a and a dotted curve 2b related to the second lens unit L2 are movement loci for correcting image plane variation accompanying varying magnification when focused at an object at infinity and a close distance object (object in proximity), respectively. Further, at the telephoto end, focusing from the object at infinity to the close distance object is performed by the second lens unit L2 being moved forward (toward the object side), as indicated by an allow 2c.

A solid curve 4a and a dotted curve 4b related to the fourth lens unit L4 are movement loci for correcting image plane variation accompanying varying magnification when focused at the object at infinity and the close distance object, respectively. Further, at the telephoto end, focusing from the object at infinity to the close distance object is performed by the fourth lens unit L4 being moved backward (toward the image side), as indicated by an arrow 4c. A lens unit interval between each pair of adjacent lens units is changed during zooming.

In Example 4, the front lens unit LF and the magnification-varying lens unit LV are the same as those of Example 1. The rear lens group LR, which includes a plurality of lens units, includes, in order from the object side to the image side, a fourth lens unit L4 having a positive refractive power, a fifth lens unit L5 having a positive refractive power, a sixth lens unit L6 having a negative refractive power, and a seventh lens unit L7 having a positive refractive power. The focusing unit Lb is the fourth lens unit L4. The focusing unit La having a positive refractive power, which is a part of the front lens group LF, is a floating lens unit. The focusing unit Lb having a positive refractive power, which is on the object side in the rear lens group LR, is a main focusing unit.

In Example 4, the two lens units that are used in focusing are arranged to be relatively close to each other in the optical axis direction in order to simplify the mechanical mechanism. Also in Example 4, the rear focusing system and the front lens focusing system are effectively combined. The focusing unit La and the focusing unit Lb, which are arranged in front of an aperture stop SP and behind the aperture stop SP, respectively, are configured to move in opposite directions by different movement amounts so that aberration variation during focusing may be effectively reduced.

In the lens cross-sectional view, a solid curve 2a and a dotted curve 2b related to the second lens unit L2 are movement loci for correcting image plane variation accompanying varying magnification when focused at an object at infinity and a close distance object (object in proximity), respectively. Further, at the telephoto end, focusing from the object at infinity to the close distance object is performed by the second lens unit L2 being moved forward (toward the object side), as indicated by an allow 2c.

A solid curve 4a and a dotted curve 4b related to the fourth lens unit L4 are movement loci for correcting image plane variation accompanying varying magnification when focused at the object at infinity and the close distance object, respectively. Further, at the telephoto end, focusing from the object at infinity to the close distance object is performed by the fourth lens unit L4 being moved backward (toward the image side), as indicated by an arrow 4c. A lens unit interval between each pair of adjacent lens units is changed during zooming.

In Example 5, the front lens group LF includes a first lens unit L1 having a positive refractive power. The focusing unit La is the first lens unit L1. The magnification-varying lens unit LV is the same as that of Example 1. The rear lens group LR, which includes a plurality of lens units, includes, in order from the object side to the image side, a third lens unit L3 having a positive refractive power, a fourth lens unit L4 having a negative refractive power, a fifth lens unit L5 having a positive refractive power, and a sixth lens unit L6 having a negative refractive power. The focusing unit Lb is the sixth lens unit L6. The focusing unit La is a floating lens unit. The focusing unit Lb having a negative refractive power, which is closest to the image side in the rear lens group LR, is a main focusing unit.

Also in Example 5, the rear focusing system and the front lens focusing system are effectively combined. The focusing unit La and the focusing unit Lb, which are arranged in front of an aperture stop SP and behind the aperture stop SP, respectively, are configured to move in opposite directions by different movement amounts so that aberration variation during focusing may be effectively reduced.

In the lens cross-sectional view, a solid curve 1a and a dotted curve 1b related to the first lens unit L1 are movement loci for correcting image plane variation accompanying varying magnification when focused at an object at infinity and a close distance object (object in proximity), respectively. Further, at the telephoto end, focusing from the object at infinity to the close distance object is performed by the first lens unit L1 being moved forward (toward the object side), as indicated by an allow 1c.

A solid curve 6a and a dotted curve 6b related to the sixth lens unit L6 are movement loci for correcting image plane variation accompanying varying magnification when focused at the object at infinity and the close distance object, respectively. Further, at the telephoto end, focusing from the object at infinity to the close distance object is performed by the sixth lens unit L6 being moved backward (toward the image side), as indicated by an arrow 6c. A lens unit interval between each pair of adjacent lens units is changed during zooming.

The lens configuration of Example 6 is described. In Example 6, the front lens group LF, which includes one or more lens units, includes, in order from the object side to the image side, a first lens unit L1 having a positive refractive power and a second lens unit L2 having a positive refractive power. The focusing unit La is the second lens unit L2. The magnification-varying lens unit LV includes a third lens unit L3 having a negative refractive power.

The rear lens group LR, which includes a plurality of lens units, includes, in order from the object side to the image side, a fourth lens unit L4 having a positive refractive power, a fifth lens unit L5 having a positive refractive power, and a sixth lens unit L6 having a positive refractive power. The focusing unit Lb is the sixth lens unit L6. The focusing unit La having a positive refractive power, which is a part of the front lens group LF, is a floating lens unit. The focusing unit Lb having a positive refractive power, which is closest to the image side in the rear lens group LR, is a main focusing unit.

In this Example, the rear focusing system and the front lens focusing system are effectively combined. The focusing unit La and the focusing unit Lb, which are arranged in front of an aperture stop SP and behind the aperture stop SP, respectively, are configured to move toward the object side by different movement amounts so that aberration variation during focusing may be effectively reduced.

In the lens cross-sectional view, a solid curve 2a and a dotted curve 2b related to the second lens unit L2 are movement loci for correcting image plane variation accompanying varying magnification when focused at an object at infinity and a close distance object (object in proximity), respectively. Further, at the telephoto end, focusing from the object at infinity to the close distance object is performed by the second lens unit L2 being moved forward (toward the object side), as indicated by an allow 2c.

A solid curve 6a and a dotted curve 6b related to the sixth lens unit L6 are movement loci for correcting image plane variation accompanying varying magnification when focused at the object at infinity and the close distance object, respectively. Further, at the telephoto end, focusing from the object at infinity to the close distance object is performed by the sixth lens unit L6 being moved forward (toward the object side), as indicated by an arrow 6c. A lens unit interval between each pair of adjacent lens units is changed during zooming. In Example described above, any lens unit may serve as the main focusing unit.

In Examples 1 to 4, and Example 6, the focusing unit La, which is a part of the front lens group LF, is the floating lens unit. In Example 5, the focusing unit La, which is the entire front lens group LF, is the floating lens unit. When the floating lens unit is a part of the front lens group LF, a light-weight floating lens unit is easily achieved. When the floating lens unit is the entire front lens group LF, the movement amount during focusing is easily reduced.

The focusing unit La is configured to move toward the object side and the focusing unit Lb is configured to move toward the object side or the image side, during focusing from infinity to short distance. The focusing unit La and the focusing unit Lb are configured to move, and hence a change in position of the center of gravity due to focusing is reduced to improve the operability of the zoom lens.

Next, a digital camera (image pickup apparatus) according to an embodiment of the present invention, which uses the zoom lens of the present invention as an image pickup optical system is described with reference to FIG. 19. In FIG. 19, a reference numeral 20 represents a digital camera main body. An image pickup optical system 21 includes the zoom lens of each of Examples described above. An image pickup element 22 (photo-electric conversion element), for example, a CCD, receives light corresponding to the object image (image) by using the image pickup optical system 21. A recording unit 23 records data on the object image corresponding to the light which is received by the image pickup element 22. A finder 24 is used to observe the object image displayed on a display element (not shown).

The display element includes a liquid crystal panel or the like. The object image formed on the image pickup element 22 is displayed on the display element. A compact image pickup apparatus having the high optical characteristic can be realized by applying the zoom lens of the present invention to the image pickup apparatus, for example, a digital camera, in such a manner.

Numerical Data 1 to 6 corresponding to Examples 1 to 6 are shown below. In each of Numerical Data, symbol i represents the order of surfaces from the object side. In each of Numerical Data, symbol ri represents a curvature radius of the i-th lens surface counted from the object side, symbol di represents a lens thickness or an air interval between the i-th surface and an (i+1)-th surface counted from the object side, and symbols ndi and vdi represent a refractive index and an Abbe number of a material between the i-th surface and the (i+1)-th surface counted from the object side, respectively.

In addition to specifications such as the focal length and the F-number, a half angle of view is a half angle of view (degree) of the entire system, an image height is the maximum image height that determines the half angle of view, and the total length of the zoom lens is a distance from the first lens surface to the image plane. Moreover, data on the respective lens units indicates focal lengths of the respective lens units. The closest imaging lateral magnification is also indicated. In addition, the part in which an interval d of each optical surface is (variable) is changed during zooming or focusing, and an interval between surfaces corresponding to the focal length is shown in an annexed table. Results of calculations of the conditional expressions based on lens data in Numerical Data 1 to 6 described below are shown in Table 1.

[Numerical Data 1]

Surface data

| Surface number | r | d | nd | vd |
|---|---|---|---|---|
| 1 | 126.007 | 3.40 | 1.48749 | 70.2 |
| 2 | 877.317 | (Variable) | | |
| 3 | 59.251 | 1.25 | 1.80000 | 29.8 |
| 4 | 36.447 | 5.76 | 1.59522 | 67.7 |
| 5 | 2051.413 | (Variable) | | |
| 6 | 176.601 | 1.05 | 1.77250 | 49.6 |
| 7 | 30.683 | 3.76 | | |
| 8 | −70.236 | 1.05 | 1.58913 | 61.1 |
| 9 | 34.299 | 2.95 | 1.80518 | 25.4 |
| 10 | 223.604 | (Variable) | | |
| 11 | 44.779 | 3.36 | 1.60311 | 60.6 |
| 12 | −580.358 | 0.15 | | |
| 13 | 47.706 | 4.58 | 1.48749 | 70.2 |
| 14 | −43.682 | 1.05 | 1.90366 | 31.3 |
| 15 | −249.132 | 0.76 | | |
| 16 (Stop) | ∞ | (Variable) | | |
| 17 | −49.860 | 0.90 | 1.66998 | 39.3 |
| 18 | 19.067 | 4.50 | 1.80000 | 29.8 |
| 19 | 129.584 | (Variable) | | |
| 20 | −191.995 | 2.74 | 1.80400 | 46.6 |
| 21 | −37.633 | 0.15 | | |
| 22 | 76.913 | 4.84 | 1.60311 | 60.6 |
| 23 | −22.273 | 0.95 | 1.90366 | 31.3 |
| 24 | −153.966 | 0.15 | | |
| 25 | 40.977 | 2.23 | 1.77250 | 49.6 |
| 26 | 99.139 | (Variable) | | |
| 27 | 95.597 | 0.95 | 1.88300 | 40.8 |
| 28 | 29.454 | 2.92 | | |
| 29 | −51.644 | 2.16 | 1.84666 | 23.8 |
| 30 | −31.310 | 8.97 | | |
| 31 | −27.304 | 1.05 | 1.70154 | 41.2 |
| 32 | 289.514 | 0.28 | | |
| 33 | 57.032 | 2.86 | 1.84666 | 23.8 |
| 34 | 791.169 | (Variable) | | |
| Image surface | ∞ | | | |

Various data
Zoom ratio 2.69

| | Wide angle | Intermediate | Telephoto |
|---|---|---|---|
| Focal length | 72.10 | 129.82 | 193.99 |
| F-number | 4.49 | 5.40 | 5.86 |
| Half angle of view (degree) | 16.70 | 9.46 | 6.36 |
| Image height | 21.64 | 21.64 | 21.64 |
| Total lens length | 164.73 | 184.09 | 196.00 |
| Lens unit interval (when focus is at infinity) | | | |
| d2 | 6.15 | 15.06 | 18.07 |
| d5 | 2.00 | 12.45 | 21.35 |
| d10 | 26.24 | 10.90 | 1.20 |
| d16 | 2.35 | 6.33 | 8.63 |
| d19 | 14.47 | 10.61 | 7.62 |
| d26 | 6.72 | 4.30 | 1.17 |
| d34 | 42.04 | 59.68 | 73.20 |
| Lens unit interval (when focus is at closest distance) | | | |
| d2 | 1.00 | 6.09 | 3.55 |
| d5 | 7.15 | 21.42 | 35.87 |
| d10 | 26.24 | 10.90 | 1.20 |

[Numerical Data 1]

| | | | |
|---|---|---|---|
| d16 | 2.35 | 6.33 | 8.63 |
| d19 | 14.47 | 10.61 | 7.62 |
| d26 | 10.57 | 12.45 | 15.17 |
| d34 | 38.18 | 51.53 | 59.20 |

Closest imaging lateral magnification

| | | |
|---|---|---|
| −0.238 | −0.438 | −0.694 |

Zoom lens unit data

| Unit | First surface | Focal length |
|---|---|---|
| 1 | 1 | 301.39 |
| 2 | 3 | 130.60 |
| 3 | 6 | −37.12 |
| 4 | 11 | 52.42 |
| 5 | 17 | −77.59 |
| 6 | 20 | 34.99 |
| 7 | 27 | −40.65 |

[Numerical Data 2]

Surface data

| Surface number | r | d | nd | vd |
|---|---|---|---|---|
| 1 | 128.168 | 3.99 | 1.51633 | 64.1 |
| 2 | 2079.248 | (Variable) | | |
| 3 | 59.086 | 1.25 | 1.74077 | 27.8 |
| 4 | 40.709 | 5.48 | 1.48749 | 70.2 |
| 5 | 634.488 | (Variable) | | |
| 6 | 168.826 | 1.05 | 1.83481 | 42.7 |
| 7 | 33.994 | 3.53 | | |
| 8 | −85.182 | 1.05 | 1.61405 | 55.0 |
| 9 | 34.442 | 4.05 | 1.84666 | 23.8 |
| 10 | 180.491 | (Variable) | | |
| 11 | 56.489 | 3.40 | 1.72000 | 50.2 |
| 12 | −174.468 | 0.15 | | |
| 13 | 40.471 | 4.71 | 1.48749 | 70.2 |
| 14 | −51.917 | 1.05 | 1.84666 | 23.8 |
| 15 | 3352.883 | 1.02 | | |
| 16 (Stop) | ∞ | (Variable) | | |
| 17 | −55.364 | 0.90 | 1.72047 | 34.7 |
| 18 | 18.802 | 3.96 | 1.84666 | 23.8 |
| 19 | 74.828 | (Variable) | | |
| 20 | −116.452 | 2.47 | 1.80400 | 46.6 |
| 21 | −38.045 | 0.15 | | |
| 22 | 68.055 | 5.08 | 1.72916 | 54.7 |
| 23 | −22.087 | 0.95 | 1.90366 | 31.3 |
| 24 | −294.724 | 0.15 | | |
| 25 | 44.979 | 2.06 | 1.83481 | 42.7 |
| 26 | 97.580 | (Variable) | | |
| 27 | 93.185 | 0.95 | 1.88300 | 40.8 |
| 28 | 27.071 | 3.09 | | |
| 29 | −51.661 | 2.08 | 1.84666 | 23.8 |
| 30 | −28.511 | 6.82 | | |
| 31 | −25.450 | 1.05 | 1.88300 | 40.8 |
| 32 | −949.858 | 0.67 | | |
| 33 | 61.889 | 4.39 | 1.80000 | 29.8 |
| 34 | −137.229 | (Variable) | | |
| Image surface | ∞ | | | |

Various data
Zoom ratio 2.69

| | Wide angle | Intermediate | Telephoto |
|---|---|---|---|
| Focal length | 72.10 | 129.54 | 193.98 |
| F-number | 4.56 | 5.42 | 5.86 |
| Half angle of view (degree) | 16.70 | 9.48 | 6.36 |

[Numerical Data 2]

| | | | |
|---|---|---|---|
| Image height | 21.64 | 21.64 | 21.64 |
| Total lens length | 174.27 | 187.86 | 197.44 |

Lens unit interval (when focus is at infinity)

| | | | |
|---|---|---|---|
| d2 | 12.65 | 12.65 | 12.65 |
| d5 | 2.00 | 15.60 | 25.18 |
| d10 | 27.79 | 12.43 | 2.24 |
| d16 | 2.28 | 6.64 | 10.36 |
| d19 | 14.98 | 10.62 | 6.90 |
| d26 | 6.97 | 4.04 | 1.18 |
| d34 | 42.09 | 60.38 | 73.43 |

Lens unit interval (when focus is at closest distance)

| | | | |
|---|---|---|---|
| d2 | 10.39 | 8.11 | 1.00 |
| d5 | 4.26 | 20.14 | 36.83 |
| d10 | 27.79 | 12.43 | 2.24 |
| d16 | 2.28 | 6.64 | 10.36 |
| d19 | 14.98 | 10.62 | 6.90 |
| d26 | 10.86 | 12.43 | 16.19 |
| d34 | 38.20 | 52.00 | 58.41 |

Closest imaging lateral magnification

| | | |
|---|---|---|
| −0.222 | −0.398 | −0.630 |

Zoom lens unit data

| Unit | First surface | Focal length |
|---|---|---|
| 1 | 1 | 264.35 |
| 2 | 3 | 177.68 |
| 3 | 6 | −39.69 |
| 4 | 11 | 45.13 |
| 5 | 17 | −56.18 |
| 6 | 20 | 33.05 |
| 7 | 27 | −42.84 |

[Numerical Data 3]

Surface data

| Surface number | r | d | nd | vd |
|---|---|---|---|---|
| 1 | 260.497 | 1.80 | 1.66998 | 39.3 |
| 2 | 102.643 | 2.46 | | |
| 3 | 127.212 | 9.44 | 1.49700 | 81.5 |
| 4 | −293.060 | 0.15 | | |
| 5 | 70.630 | 7.44 | 1.49700 | 81.5 |
| 6 | 176.032 | (Variable) | | |
| 7 | 50.616 | 1.80 | 1.84666 | 23.8 |
| 8 | 41.457 | 1.34 | | |
| 9 | 47.563 | 8.38 | 1.49700 | 81.5 |
| 10 | −2245.257 | (Variable) | | |
| 11 | 406.968 | 1.20 | 1.80400 | 46.6 |
| 12 | 31.902 | 7.56 | | |
| 13 | −84.845 | 1.26 | 1.49700 | 81.5 |
| 14 | 35.177 | 5.33 | 1.84666 | 23.8 |
| 15 | 428.147 | 3.13 | | |
| 16 | −51.892 | 1.20 | 1.80400 | 46.6 |
| 17 | −1119.967 | (Variable) | | |
| 18 | 302.829 | 4.41 | 1.80400 | 46.6 |
| 19 | −79.565 | 0.15 | | |
| 20 | 271.705 | 5.79 | 1.49700 | 81.5 |
| 21 | −47.922 | 1.20 | 1.83400 | 37.2 |
| 22 | −182.549 | (Variable) | | |
| 23 (Stop) | ∞ | 0.39 | | |
| 24 | 57.816 | 4.12 | 1.77250 | 49.6 |
| 25 | 158.490 | 0.15 | | |
| 26 | 46.013 | 3.45 | 1.77250 | 49.6 |
| 27 | 64.518 | 2.70 | | |
| 28 | 228.641 | 4.55 | 1.74000 | 28.3 |
| 29 | 32.997 | 6.00 | 1.49700 | 81.5 |
| 30 | −631.865 | 2.00 | | |
| 31 | 149.773 | 4.77 | 1.80518 | 25.4 |

-continued

[Numerical Data 3]

| | | | | |
|---|---|---|---|---|
| 32 | −55.853 | 1.20 | 1.59551 | 39.2 |
| 33 | 35.640 | 4.29 | | |
| 34 | −65.840 | 1.20 | 1.74400 | 44.8 |
| 35 | −236.280 | 6.58 | | |
| 36 | 439.133 | 4.93 | 1.80610 | 40.9 |
| 37 | −65.850 | 0.28 | | |
| 38 | 188.617 | 8.53 | 1.48749 | 70.2 |
| 39 | −31.750 | 1.50 | 1.83400 | 37.2 |
| 40 | −7114.924 | 8.76 | | |
| 41 | 72.198 | 4.60 | 1.83400 | 37.2 |
| 42 | 268.078 | (Variable) | | |
| Image surface | ∞ | | | |

Various data
Zoom ratio 2.69

| | Wide angle | Intermediate | Telephoto |
|---|---|---|---|
| Focal length | 72.00 | 135.00 | 194.00 |
| F-number | 2.90 | 2.90 | 2.90 |
| Half angle of view (degree) | 16.72 | 9.10 | 6.36 |
| Image height | 21.64 | 21.64 | 21.64 |
| Total lens length | 248.04 | 248.04 | 248.04 |

Lens unit interval (when focus is at infinity)

| | | | |
|---|---|---|---|
| d6 | 6.07 | 28.77 | 35.89 |
| d10 | 1.58 | 10.02 | 13.58 |
| d17 | 27.81 | 14.31 | 1.50 |
| d22 | 24.28 | 6.63 | 8.76 |
| d42 | 54.26 | 54.26 | 54.26 |

Lens unit interval (when focus is at closest distance)

| | | | |
|---|---|---|---|
| d6 | 1.00 | 19.58 | 23.98 |
| d10 | 6.65 | 19.21 | 25.50 |
| d17 | 30.38 | 19.45 | 8.76 |
| d22 | 21.71 | 1.50 | 1.50 |
| d42 | 54.26 | 54.26 | 54.26 |

Closest imaging lateral magnification

| | | |
|---|---|---|
| −0.094 | −0.168 | −0.250 |

Zoom lens unit data

| Unit | First surface | Focal length |
|---|---|---|
| 1 | 1 | 164.77 |
| 2 | 7 | 139.40 |
| 3 | 11 | −24.97 |
| 4 | 18 | 82.10 |
| 5 | 23 | 99.06 |

[Numerical Data 4]

Surface data

| Surface number | r | d | nd | vd |
|---|---|---|---|---|
| 1 | 254.819 | 4.56 | 1.48749 | 70.2 |
| 2 | 2500.885 | (Variable) | | |
| 3 | 332.224 | 3.00 | 1.80610 | 33.3 |
| 4 | 82.483 | 0.57 | | |
| 5 | 91.032 | 9.08 | 1.49700 | 81.5 |
| 6 | −228.274 | 0.15 | | |
| 7 | 72.374 | 9.20 | 1.49700 | 81.5 |
| 8 | −432.920 | (Variable) | | |
| 9 | −103.704 | 4.44 | 1.90366 | 31.3 |
| 10 | −38.888 | 2.00 | 1.65160 | 58.5 |
| 11 | 40.844 | 2.45 | | |
| 12 | 428.327 | 2.00 | 1.65160 | 58.5 |
| 13 | 25.410 | 5.40 | 1.90366 | 31.3 |

[Numerical Data 4]

| | | | | |
|---|---|---|---|---|
| 14 | 236.606 | 2.45 | | |
| 15 | −43.184 | 2.00 | 1.83481 | 42.7 |
| 16 | 131.306 | (Variable) | | |
| 17 | 650.491 | 3.23 | 1.59282 | 68.6 |
| 18 | −91.558 | 0.15 | | |
| 19 | 72.460 | 2.00 | 1.90366 | 31.3 |
| 20 | 36.517 | 6.08 | 1.49700 | 81.5 |
| 21 | −92.081 | (Variable) | | |
| 22 | −68.057 | 2.00 | 1.84666 | 23.8 |
| 23 | −89.624 | 0.15 | | |
| 24 | 50.636 | 5.06 | 1.59282 | 68.6 |
| 25 | −178.508 | 4.02 | | |
| 26 (Stop) | ∞ | (Variable) | | |
| 27 | 84.033 | 3.28 | 1.80610 | 33.3 |
| 28 | −289.199 | 1.57 | 1.72916 | 54.7 |
| 29 | 48.375 | 1.89 | | |
| 30 | −481.106 | 1.50 | 1.65160 | 58.5 |
| 31 | 121.273 | (Variable) | | |
| 32 | 158.707 | 4.63 | 1.51742 | 52.4 |
| 33 | −42.609 | 0.94 | | |
| 34 | −36.715 | 2.24 | 1.80610 | 33.3 |
| 35 | −70.709 | 8.22 | | |
| 36 | 77.395 | 8.93 | 1.57501 | 41.5 |
| 37 | −30.760 | 2.00 | 1.88300 | 40.8 |
| 38 | −397.965 | (Variable) | | |
| Image surface | ∞ | | | |

Various data
Zoom ratio 4.00

| | Wide angle | Intermediate | Telephoto |
|---|---|---|---|
| Focal length | 70.98 | 141.89 | 283.59 |
| F-number | 4.03 | 5.12 | 5.80 |
| Half angle of view (degree) | 16.95 | 8.67 | 4.36 |
| Image height | 21.64 | 21.64 | 21.64 |
| Total lens length | 228.54 | 263.44 | 281.60 |

Lens unit interval (when focus is at infinity)

| | | | |
|---|---|---|---|
| d2 | 7.02 | 20.80 | 20.44 |
| d8 | 4.00 | 16.80 | 33.97 |
| d16 | 29.56 | 15.29 | 2.00 |
| d21 | 11.03 | 6.98 | 5.28 |
| d26 | 19.52 | 25.16 | 29.64 |
| d31 | 12.33 | 4.20 | 4.02 |
| d38 | 39.85 | 68.99 | 81.04 |

Lens unit interval (when focus is at closest distance)

| | | | |
|---|---|---|---|
| d2 | 2.00 | 12.14 | 6.95 |
| d8 | 9.02 | 25.47 | 47.46 |
| d16 | 31.28 | 17.55 | 4.81 |
| d21 | 9.32 | 4.72 | 2.47 |
| d26 | 19.52 | 25.16 | 29.64 |
| d31 | 12.33 | 4.20 | 4.02 |
| d38 | 39.85 | 68.99 | 81.04 |

Closest imaging lateral magnification

| | | |
|---|---|---|
| −0.087 | −0.182 | −0.392 |

Zoom lens unit data

| Unit | First surface | Focal length |
|---|---|---|
| 1 | 1 | 581.63 |
| 2 | 3 | 118.91 |
| 3 | 9 | −25.33 |
| 4 | 17 | 71.38 |
| 5 | 22 | 81.46 |
| 6 | 27 | −87.24 |
| 7 | 32 | 190.36 |

[Numerical Data 5]

Surface data

| Surface number | r | d | nd | vd |
|---|---|---|---|---|
| 1 | 66.176 | 1.25 | 1.80000 | 29.8 |
| 2 | 40.055 | 6.00 | 1.59522 | 67.7 |
| 3 | −778.361 | (Variable) | | |
| 4 | 67.768 | 1.05 | 1.77250 | 49.6 |
| 5 | 30.919 | 4.16 | | |
| 6 | −71.750 | 1.05 | 1.58913 | 61.1 |
| 7 | 34.394 | 4.89 | 1.80518 | 25.4 |
| 8 | 147.698 | (Variable) | | |
| 9 | 58.600 | 3.55 | 1.60311 | 60.6 |
| 10 | −295.263 | 0.15 | | |
| 11 | 40.085 | 5.47 | 1.48749 | 70.2 |
| 12 | −54.974 | 1.05 | 1.90366 | 31.3 |
| 13 | −269.455 | 0.71 | | |
| 14 (Stop) | ∞ | (Variable) | | |
| 15 | −45.707 | 0.90 | 1.66998 | 39.3 |
| 16 | 21.600 | 6.01 | 1.80000 | 29.8 |
| 17 | 83.097 | (Variable) | | |
| 18 | −404.679 | 3.52 | 1.80400 | 46.6 |
| 19 | −38.780 | 0.15 | | |
| 20 | 86.512 | 7.85 | 1.60311 | 60.6 |
| 21 | −23.220 | 0.95 | 1.90366 | 31.3 |
| 22 | −171.263 | 0.15 | | |
| 23 | 45.851 | 2.66 | 1.77250 | 49.6 |
| 24 | 943.105 | (Variable) | | |
| 25 | 214.108 | 0.95 | 1.88300 | 40.8 |
| 26 | 30.180 | 2.76 | | |
| 27 | −46.195 | 5.09 | 1.84666 | 23.9 |
| 28 | −27.280 | 7.99 | | |
| 29 | −24.126 | 1.05 | 1.70154 | 41.2 |
| 30 | −156.084 | 0.15 | | |
| 31 | 50.204 | 2.27 | 1.84666 | 23.9 |
| 32 | 98.403 | (Variable) | | |
| Image surface | ∞ | | | |

Various data
Zoom ratio 2.69

| | Wide angle | Intermediate | Telephoto |
|---|---|---|---|
| Focal length | 72.10 | 129.94 | 193.96 |
| F-number | 4.58 | 5.51 | 5.86 |
| Half angle of view (degree) | 16.70 | 9.45 | 6.36 |
| Image height | 21.64 | 21.64 | 21.64 |
| Total lens length | 167.80 | 181.03 | 192.09 |

Lens unit interval (when focus is at infinity)

| | | | |
|---|---|---|---|
| d3 | 2.00 | 15.23 | 26.28 |
| d8 | 29.24 | 11.55 | 1.20 |
| d14 | 2.41 | 9.49 | 16.46 |
| d17 | 11.59 | 6.36 | 2.00 |
| d24 | 4.70 | 2.88 | 1.03 |
| d32 | 46.09 | 63.74 | 73.33 |

Lens unit interval (when focus is at closest distance)

| | | | |
|---|---|---|---|
| d3 | 7.57 | 30.58 | 53.21 |
| d8 | 29.24 | 11.55 | 1.20 |
| d14 | 2.41 | 9.49 | 16.46 |
| d17 | 11.59 | 6.36 | 2.00 |
| d24 | 7.35 | 8.79 | 12.60 |
| d32 | 43.44 | 57.83 | 61.77 |

Closest imaging lateral magnification

| | | | |
|---|---|---|---|
| | −0.215 | −0.421 | −0.682 |

Zoom lens unit data

| Unit | First surface | Focal length |
|---|---|---|
| 1 | 1 | 128.91 |
| 2 | 4 | −46.79 |
| 3 | 9 | 49.07 |
| 4 | 15 | −53.85 |
| 5 | 18 | 30.34 |
| 6 | 25 | −35.84 |

[Numerical Data 6]

Surface data

| Surface number | r | d | nd | vd |
|---|---|---|---|---|
| 1 | 245.376 | 1.80 | 1.66998 | 39.3 |
| 2 | 105.515 | 1.23 | | |
| 3 | 125.813 | 9.16 | 1.49700 | 81.5 |
| 4 | −298.520 | 0.15 | | |
| 5 | 70.351 | 6.91 | 1.49700 | 81.5 |
| 6 | 163.820 | (Variable) | | |
| 7 | 50.753 | 1.80 | 1.84666 | 23.8 |
| 8 | 40.850 | 1.03 | | |
| 9 | 45.701 | 7.79 | 1.49700 | 81.5 |
| 10 | 14640.067 | (Variable) | | |
| 11 | 494.770 | 1.20 | 1.80400 | 46.6 |
| 12 | 33.190 | 6.01 | | |
| 13 | −86.852 | 5.24 | 1.49700 | 81.5 |
| 14 | 36.971 | 5.23 | 1.84666 | 23.8 |
| 15 | 511.778 | 2.86 | | |
| 16 | −57.664 | 1.25 | 1.80400 | 46.6 |
| 17 | 1933.632 | (Variable) | | |
| 18 | 257.322 | 4.28 | 1.80400 | 46.6 |
| 19 | −91.996 | 0.15 | | |
| 20 | 412.434 | 5.58 | 1.49700 | 81.5 |
| 21 | −49.191 | 1.20 | 1.83400 | 37.2 |
| 22 | −142.777 | (Variable) | | |
| 23 (Stop) | ∞ | 0.39 | | |
| 24 | 56.647 | 3.93 | 1.77250 | 49.6 |
| 25 | 143.379 | 0.15 | | |
| 26 | 45.975 | 4.75 | 1.77250 | 49.6 |
| 27 | 63.538 | 1.84 | | |
| 28 | 334.076 | 1.50 | 1.74000 | 28.3 |
| 29 | 33.966 | 5.99 | 1.49700 | 81.5 |
| 30 | −1299.269 | 2.00 | | |
| 31 | 119.244 | 4.97 | 1.80518 | 25.4 |
| 32 | −56.448 | 1.20 | 1.59551 | 39.2 |
| 33 | 34.651 | 4.39 | | |
| 34 | −65.294 | 1.20 | 1.74400 | 44.8 |
| 35 | −443.105 | 4.94 | | |
| 36 | 552.461 | 5.14 | 1.83481 | 42.7 |
| 37 | −64.237 | 0.15 | | |
| 38 | 234.299 | 7.98 | 1.53996 | 59.5 |
| 39 | −32.344 | 1.50 | 1.83400 | 37.2 |
| 40 | −540.946 | (Variable) | | |
| 41 | 80.918 | 4.53 | 1.77250 | 49.6 |
| 42 | 294.180 | (Variable) | | |
| Image surface | ∞ | | | |

Various data
Zoom ratio 2.69

| | Wide angle | Intermediate | Telephoto |
|---|---|---|---|
| Focal length | 72.00 | 135.00 | 194.00 |
| F-number | 2.90 | 2.90 | 2.90 |
| Half angle of view (degree) | 16.72 | 9.10 | 6.36 |
| Image height | 21.64 | 21.64 | 21.64 |
| Total lens length | 245.77 | 245.77 | 245.77 |
| BF | 54.00 | 54.00 | 54.00 |

Lens unit interval (when focus is at infinity)

| | | | |
|---|---|---|---|
| d6 | 6.18 | 31.55 | 39.07 |
| d10 | 1.58 | 8.86 | 12.05 |
| d17 | 29.79 | 15.19 | 1.50 |
| d22 | 19.56 | 1.50 | 4.48 |

-continued

[Numerical Data 6]

| | | | |
|---|---|---|---|
| d40 | 15.23 | 15.23 | 15.23 |
| d42 | 54.00 | 54.00 | 54.00 |

Lens unit interval (when focus is at closest distance)

| | | | |
|---|---|---|---|
| d6 | 1.00 | 22.10 | 27.41 |
| d10 | 6.76 | 18.31 | 23.71 |
| d17 | 29.79 | 15.19 | 1.50 |
| d22 | 19.56 | 1.50 | 4.48 |
| d40 | 9.83 | 4.61 | 1.50 |
| d42 | 59.40 | 64.62 | 67.73 |

Closest imaging lateral magnification

| | | |
|---|---|---|
| −0.092 | −0.171 | −0.250 |

Zoom lens unit data

| Unit | First surface | Focal length |
|---|---|---|
| 1 | 1 | 161.99 |
| 2 | 7 | 142.85 |
| 3 | 11 | −25.79 |
| 4 | 18 | 83.22 |
| 5 | 23 | 185.55 |
| 6 | 41 | 143.17 |

TABLE 1

| Conditional Expression | Example 1 | Example 2 | Example 3 | Example 4 | Example 5 | Example 6 |
|---|---|---|---|---|---|---|
| (1) Maw/Mat | 0.355 | 0.194 | 0.426 | 0.372 | 0.207 | 0.444 |
| (2) Mbw/Mbt | 0.275 | 0.259 | 0.354 | 0.610 | 0.229 | 0.393 |
| (3) Maw/Mbw | 1.335 | 0.582 | 1.971 | 2.924 | 2.104 | 0.960 |
| (4) Mat/Mbt | 1.037 | 0.776 | 1.640 | 4.790 | 2.328 | 0.849 |
| (5) fa/ft | 0.673 | 0.916 | 0.719 | 0.419 | 0.665 | 0.736 |
| (6) \|fb\|/ft | 0.210 | 0.221 | 0.423 | 0.252 | 0.185 | 0.738 |
| (7) ffw/ft | 0.479 | 0.566 | 0.407 | 0.359 | 0.665 | 0.409 |
| (8) \|fv\|/fw | 0.515 | 0.550 | 0.347 | 0.357 | 0.414 | 0.358 |
| (9) (Lfvt − Lfvw)/fw | 0.268 | 0.321 | 0.167 | 0.422 | 0.337 | 0.145 |
| (10) fa/ffw | 1.406 | 1.619 | 1.767 | 1.168 | 1.000 | 1.799 |
| (11) frw/fw | 0.631 | 0.658 | 0.869 | 0.629 | 0.686 | 0.882 |
| (12) (βMODt/βMODw)/(ft/fw) | 1.083 | 1.057 | 0.983 | 1.123 | 1.179 | 1.009 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-061487, filed Mar. 25, 2016, which is hereby incorporated by reference herein in its entirety.

What is claimed is:

1. A zoom lens, comprising, in order from an object side to an image side:
   a front lens group LF only including one or more lens unit having a positive refractive power;
   a magnification-varying lens unit LV consisting of a lens unit having a negative refractive power and being configured to move during zooming; and
   a rear lens group LR having a positive refractive power, which includes a plurality of lens units,
   wherein an interval between each pair of adjacent lens units is changed during zooming,
   wherein the front lens group LF includes a focusing unit La having a positive refractive power,
   wherein the rear lens group LR includes a focusing unit Lb,
   wherein the focusing unit La is configured to move toward the object side and the focusing unit Lb is configured to move toward one of the object side and the image side, during focusing from infinity to close distance, and
   wherein the following conditional expression is satisfied:

$$0.1 < Maw/Mat < 0.6,$$

where Maw represents a movement amount of the focusing unit La at a wide angle end during focusing from infinity to closest distance, and Mat represents a movement amount of the focusing unit La at a telephoto end during focusing from infinity to closest distance.

2. A zoom lens according to claim 1, wherein the following conditional expression is satisfied:

$$0.15 < Mbw/Mbt < 0.80,$$

where Mbw represents a movement amount of the focusing unit Lb at the wide angle end during focusing from infinity to closest distance, and Mbt represents a movement amount of the focusing unit Lb at the telephoto end during focusing from infinity to closest distance.

3. A zoom lens according to claim 1, wherein the following conditional expression is satisfied:

$$0.3 < Maw/Mbw < 5.0,$$

where Mbw represents a movement amount of the focusing unit Lb at the wide angle end during focusing from infinity to closest distance.

4. A zoom lens according to claim 1, wherein the following conditional expression is satisfied:

$$0.5 < Mat/Mbt < 7.0,$$

where Mbt represents a movement amount of the focusing unit Lb at the telephoto end during focusing from infinity to closest distance.

5. A zoom lens according to claim 1, wherein the following conditional expression is satisfied:

$$0.3 < fa/ft < 1.1,$$

where fa represents a focal length of the focusing unit La, and ft represents a focal length of the zoom lens at the telephoto end.

6. A zoom lens according to claim 1, wherein the following conditional expression is satisfied:

$$0.10 < |fb|/ft < 0.80,$$

where fb represents a focal length of the focusing unit Lb, and ft represents a focal length of the zoom lens at the telephoto end.

7. A zoom lens according to claim 1, wherein the following conditional expression is satisfied:

$$0.30 < ffw/ft < 0.70,$$

where ffw represents a focal length of the front lens group LF at the wide angle end, and ft represents a focal length of the zoom lens at the telephoto end.

8. A zoom lens according to claim 1, wherein the following conditional expression is satisfied:

$$0.30 < |fv|/fw < 0.65,$$

where fv represents a focal length of the magnification-varying unit LV, and fw represents a focal length of the zoom lens at the wide angle end.

9. A zoom lens according to claim 1, wherein the following conditional expression is satisfied:

$$0.10 < (Lfvt - Lfvw)/fw < 0.50,$$

where fw represents a focal length of the zoom lens at the wide angle end, Lfvw represents an interval between the front lens group LF and the magnification-varying lens unit LV at the wide angle end, and Lfvt represents an interval between the front lens group LF and the magnification-varying lens unit LV at the telephoto end.

10. A zoom lens according to claim 1, wherein the following conditional expression is satisfied:

$$0.90 < fa/ffw < 2.00,$$

where fa represents a focal length of the focusing unit La, and ffw represents a focal length of the front lens group LF at the wide angle end.

11. A zoom lens according to claim 1, wherein the following conditional expression is satisfied:

$$0.5 < frw/fw < 1.0,$$

where frw represents a focal length of the rear lens group LR at the wide angle end, and fw represents a focal length of the zoom lens at the wide angle end.

12. A zoom lens according to claim 1, wherein the following conditional expression is satisfied:

$$0.95 < (\beta MODt/\beta MODw)/(ft/fw) < 1.20,$$

where fw represents a focal length of the zoom lens at the wide angle end, ft represents a focal length of the zoom lens at the telephoto end, $\beta MODw$ represents an imaging lateral magnification at the wide angle end when focused at an object at closest distance, and $\beta MODt$ represents an imaging lateral magnification at the telephoto end when focused at the object at the closest distance.

13. A zoom lens according to claim 1,
wherein the front lens group LF consists of, in order from the object side to the image side, a first lens unit having a positive refractive power and a second lens unit having a positive refractive power, and
wherein the focusing unit La corresponds to the second lens unit.

14. A zoom lens according to claim 13,
wherein the rear lens group LR consists of, in order from the object side to the image side, a fourth lens unit having a positive refractive power, a fifth lens unit having a negative refractive power, a sixth lens unit having a positive refractive power, and a seventh lens unit having a negative refractive power, and
wherein the focusing unit Lb corresponds to the seventh lens unit.

15. A zoom lens according to claim 13,
wherein the rear lens group LR consists of, in order from the object side to the image side, a fourth lens unit having a positive refractive power and a fifth lens unit having a positive refractive power, and
wherein the focusing unit Lb corresponds to the fourth lens unit.

16. A zoom lens according to claim 13,
wherein the rear lens group LR consists of, in order from the object side to the image side, a fourth lens unit having a positive refractive power, a fifth lens unit having a positive refractive power, a sixth lens unit having a negative refractive power, and a seventh lens unit having a positive refractive power, and
wherein the focusing unit Lb corresponds to the fourth lens unit.

17. A zoom lens according to claim 1,
wherein the front lens group LF consists of a first lens unit having a positive refractive power, and
wherein the focusing unit La corresponds to the first lens unit.

18. A zoom lens according to claim 17,
wherein the rear lens group LR consists of, in order from the object side to the image side, a third lens unit having a positive refractive power, a fourth lens unit having a negative refractive power, a fifth lens unit having a positive refractive power, and a sixth lens unit having a negative refractive power, and
wherein the focusing unit Lb corresponds to the sixth lens unit.

19. An image pickup apparatus, comprising:
a zoom lens; and
an image pickup element configured to receive an image formed by the zoom lens,
the zoom lens comprising, in order from an object side to an image side:
 a front lens group LF only including one or more lens unit having a positive refractive power;
 a magnification-varying lens unit LV consisting of a lens unit having a negative refractive power and being configured to move during zooming; and
 a rear lens group LR having a positive refractive power, which includes a plurality of lens units,
wherein an interval between each pair of adjacent lens units is changed during zooming,
wherein the front lens group LF includes a focusing unit La having a positive refractive power,
wherein the rear lens group LR includes a focusing unit Lb,
wherein the focusing unit La is configured to move toward the object side and the focusing unit Lb is configured to move toward one of the object side and the image side, during focusing from infinity to close distance, and
wherein the following conditional expression is satisfied:

$$0.1 < Maw/Mat < 0.6,$$

where Maw represents a movement amount of the focusing unit La at a wide angle end during focusing from infinity to closest distance, and Mat represents a movement amount of the focusing unit La at a telephoto end during focusing from infinity to closest distance.

* * * * *